United States Patent
Ren et al.

(10) Patent No.: US 12,421,367 B2
(45) Date of Patent: Sep. 23, 2025

(54) POLYURETHANE RIGID FOAM

(71) Applicant: Dow Global Technologies LLC, Midland, MI (US)

(72) Inventors: Dakai Ren, Manvel, TX (US); William J. Harris, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 535 days.

(21) Appl. No.: 17/778,456

(22) PCT Filed: Feb. 15, 2021

(86) PCT No.: PCT/US2021/018091
§ 371 (c)(1),
(2) Date: May 20, 2022

(87) PCT Pub. No.: WO2021/167857
PCT Pub. Date: Aug. 26, 2021

(65) Prior Publication Data
US 2022/0411599 A1 Dec. 29, 2022

Related U.S. Application Data

(60) Provisional application No. 62/977,532, filed on Feb. 17, 2020.

(51) Int. Cl.
| | |
|---|---|
| C04B 26/16 | (2006.01) |
| C08G 18/18 | (2006.01) |
| C08G 18/20 | (2006.01) |
| C08G 18/22 | (2006.01) |
| C08G 18/28 | (2006.01) |
| C08G 18/30 | (2006.01) |
| C08G 18/48 | (2006.01) |
| C08G 18/76 | (2006.01) |
| C08J 9/00 | (2006.01) |
| C08J 9/12 | (2006.01) |
| C08L 75/08 | (2006.01) |

(52) U.S. Cl.
CPC ........ *C08J 9/0085* (2013.01); *C08G 18/2063* (2013.01); *C08G 18/4829* (2013.01); *C08G 18/7671* (2013.01); *C08J 9/125* (2013.01); C08G 2110/0025 (2021.01); C08G 2110/0083 (2021.01); C08J 2203/10 (2013.01); C08J 2205/10 (2013.01); C08J 2375/08 (2013.01)

(58) Field of Classification Search
None
See application file for complete search history.

(56) References Cited

U.S. PATENT DOCUMENTS

| | | | |
|---|---|---|---|
| 2,834,748 A | 5/1958 | Bailey et al. | |
| 2,846,458 A | 8/1958 | Haluska | |
| 2,917,480 A | 12/1959 | Bailey et al. | |
| 4,680,214 A | 7/1987 | Frisch et al. | |
| 5,350,780 A * | 9/1994 | Welte | C08G 18/4018 |
| | | | 528/48 |
| 5,600,019 A | 2/1997 | Bhattacharjee et al. | |
| 6,887,911 B2 | 5/2005 | Shidaker et al. | |
| 8,124,665 B2 | 2/2012 | Rosthauser et al. | |
| 2005/0267228 A1 | 12/2005 | Andrew et al. | |
| 2008/0262168 A1 | 10/2008 | Bleys et al. | |
| 2010/0056659 A1 | 3/2010 | Rosthauser et al. | |
| 2012/0004334 A1 * | 1/2012 | Kramer | C08G 18/4219 |
| | | | 521/88 |
| 2019/0284363 A1 | 9/2019 | Albers et al. | |
| 2020/0339733 A1 * | 10/2020 | Rider | C08G 18/4812 |

FOREIGN PATENT DOCUMENTS

| | | |
|---|---|---|
| CN | 105348482 A | 2/2016 |
| CN | 106632953 A | 5/2017 |
| CN | 108017772 A | 5/2018 |
| CN | 110128692 A | 8/2019 |
| CN | 110467709 A | 11/2019 |
| JP | 2010280839 A | 12/2010 |

* cited by examiner

Primary Examiner — Melissa A Rioja

(57) ABSTRACT

A foam-forming composition for producing a rigid polyurethane foam including: (a) at least one isocyanate component; and (b) at least one isocyanate-reactive composition including: (bi) a rigid polyol compound; and (bii) a flexible polyol compound; (c) a catalyst package including at least one latent gelling catalyst; and (d) at least one blowing agent.

9 Claims, 3 Drawing Sheets

POLYURETHANE RIGID FOAM

FIELD

Embodiments relate to a foam-forming composition; a process for producing a rigid polyurethane foam article from the foam-forming composition with a reduced demolding time; and a foam article with reduced defects (e.g., cracks) and excellent mechanical performance, and improved thermal stability.

Introduction

Polyurethane rigid (PUR) foams and methods of manufacturing PUR foams are well known. In general, the PUR foams are prepared by mixing reactive chemical components, such an isocyanate component with an isocyanate-reactive component, in the presence of normally used additives such as suitable catalysts, surfactants, flame retardants, and blowing agents. Typically, PUR foams are formed from two separate components, a first component commonly referred to as an "A-side" component; and a second component commonly referred to as a "B-side" component. The A-side and B-side components react when the two components come into contact with each other. For preparing traditional PUR foams, the first component, or the A-side, contains an isocyanate component such as a di- or polyisocyanate that has a high level of highly reactive isocyanate (N=C=O) functional groups on the molecule. The second component, or the B-side, contains an isocyanate-reactive component having functional groups that are reactive with the isocyanate functional groups of the A-side component. The isocyanate-reactive component are generally polyols having two or more hydroxyl groups. In some cases, mixtures of diols, triols and higher nominal functionality polyols are used to achieve desired foaming properties. For the production of PUR foam, the isocyanate and polyol are commonly implemented near a 1:1 stoichiometric ratio (isocyanate index~100) of the first component isocyanate functional groups to the second component isocyanate-reactive groups (A-side:B-side). PUR foams can also be produced with the isocyanate is used in excess. In addition to the urethane, urea and other structures formed by the reaction of isocyanates with compounds having reactive hydrogen atoms, reaction of the isocyanate groups with each other produces isocyanurate structures in such PUR foams primarily when isocyanate is used in excess (e.g., isocyanate index >110).

PUR foams are commonly used to prepare reaction injection molded (RIM), structural, PUR foam articles such as foam panels reinforced with layers of fiberglass and fabricated, molded articles. These foam panels and articles offer a light-weight replacement for wood composites and other traditional materials. Generally, such PUR foam articles are fabricated by curing a reaction mixture of A-side and B-side in a heated mold. To achieve necessary density of such PUR articles, the mold is generally overpacked, which means the amount of foam forming reaction mixture is more than the minimum amount needed to fill the mold cavity. The expansion from the blowing gases during the molding process can develop high internal pressure that causes swelling and/or cracking defects in the PUR articles after demolding. Higher internal pressure can occur with the increase of overpacking ratio, article thickness, and temperature. A minimum residence time (demolding time) in the mold is required for the PUR articles to develop enough mechanical strength to minimize or avoid those defects.

It is appreciated in the art of making foam that the productivity of fabricating high-density foam articles can be improved by reducing the demolding time of the fabricated foam articles. However, challenges for improving the foam fabrication process and foam articles are not only directed to reducing the demolding time of the fabricated, high density foam articles, but also to reducing the foam article's defects after demolding such as swelling/dimensional deformation and formation of cracks while maintaining or preferably improving physical performance and/or thermal stability attributes of the foam articles. The above defects are believed to be related to the internal pressure from the liberation of gas during curing of the foam formulation. Meanwhile, it is desirable that the polyurethane reaction mixture to have a sufficiently long cream time or also known as initiation time (time from mixing A-side and B-side to the start of foaming) to allow good mold filling and wetting and to avoid leakage from excessive foaming prior to closing the mold.

Heretofore, faster green strength development has been utilized to somewhat mitigate prior processes/issues by using: polyols with a high nominal functionality and/or a low hydroxyl equivalent weight (HEW); higher nominal functionality isocyanates; autocatalytic polyols (which are typically amine initiated polyether polyols); and/or a near stoichiometric ratio of isocyanate (NCO) and polyol (OH) (i.e., a NCO/OH ratio equal to ~1). Still, the above faster green strength developments, by themselves, are not sufficient to provide additional improvements in the process/processability of foam articles in terms of reducing demolding time (i.e., improved productivity) while maintaining, or preferably improving, requisite PUR foam panel attributes such as modulus, strength, dimensional stability, aesthetics, low-to-no defects, and the like.

For example, JP2010280839A discloses a PUR foam composition, a PUR foam, and a synthetic wood made using the foam composition. The PUR foam composition includes a polyol component (A) and an organic isocyanate component (B). The polyol component (A) contains: (A1) a polyether polyol having a number of hydroxyl groups of from 4 to 8 and an average hydroxyl value of from 400 mg KOH/g to 800 mg KOH/g; (A2) a polyether polyol having a number of hydroxyl groups of from 2 to 4 and an average hydroxyl value of 20 mg KOH/g to 70 mg KOH/g; and (A3) a polyol having a number of hydroxyl groups of 2 to 3 and an average hydroxyl value of 600 mg KOH/g to 1,800 mg KOH/g. The blend ratio (weight ratio) of the foam composition described in JP2010280839A is as follows: (A1)/(A2)/(A3)=30-90/5-35/5-35. However, the process and the PUR foam composition produced by the process of JP2010280839A has low blowing agent (water) content meaning high free rise density thus low molding overpacking ratio and does not include an improvement in both demolding time and foam product properties.

U.S. Pat. No. 6,887,911B2 describes a PUR system to make molded articles with reduced demolding time and reduced product defects. While the use of a flexible polyol, at a concentration of from 0 wt % to 30 wt % based on the total isocyanate-reactive composition, is mentioned in the above patent, the patent does not teach the flexible polyol being utilized or described in the patent examples, but does teach the use of short crosslinkers and chain extenders with substantive amounts of short crosslinkers (i.e., glycerine, >5 wt %) being utilized or described in the patent examples. In addition, the PUR system of the patent requires a partially immiscible fatty compound.

US2019/0284363 A1 describes a PUR foam composition comprising a polyol composition and an isocyanate composition. The polyol composition includes 3 wt % to 10 wt % of a flexible polyol. The above reference also teaches that the viscosity of the isocyanate composition is required to be >300 mPa·s. The above reference also teaches and requires at least one physical blowing agent (i.e., not water). Furthermore, the foam composition described in US2019/0284363 A1 is required to include an aromatic amine-initiated polyol.

U.S. Pat. No. 4,680,214 describes a high-density (>20 pounds per cubic foot (PCF) e.g., 20 PCF=320 kg/m$^3$) PUR foam system for preparing a reinforced foam composite. The system disclosed in the above patent requires a multi-polyol component comprising a rigid polyol, a flexible polyol, and an aromatic polyester polyol. In addition, the foam system has an isocyanate index of up to 500 with a trimerization catalyst.

In US 2005/0267228 A1, a catalyst composition for use in forming PU products is disclosed. The catalyst composition includes a gelling catalyst, a trimerization catalyst, and a cure accelerator. The catalyst composition described in US 2005/0267228 A1 provides foam composition having a short demolding time while maintaining a long initiation time.

US 2008/0262168 A1 describes a process for preparing polyisocyanurate foam materials at an extremely high isocyanate index range of from 1,600 to 100,000. The primary component in the polyol composition of the foam composition described in US 2008/0262168 A1 is a flexible polyol (at a concentration of from 80 wt % to 100 wt % with a 65% to 100% oxyethylene content); and the use of system components at the extremely high isocyanate index provides a foam composition having a short demolding time.

It is desired to provide a foam-forming composition and process for producing a PUR foam article that exhibits a sufficient cream time, reduced demolding time, reduced defects (e.g., cracks), excellent mechanical performance, and improved thermal stability

SUMMARY

Embodiments described herein address problems of the molded rigid foam articles produced using prior art processes by providing a foam-forming composition and process for producing a PUR foam article with sufficient cream time (e.g., >20 s), reduced demolding time (e.g., >20% reduction), reduced defects (e.g., crack defect ratio <0.06) and reduced dimensional instability (e.g., bulging ratio <6%), while maintaining or improving mechanical performance (e.g., flexural modulus >500 MPa, flexural strength >12 MPa) and thermal stability (e.g., a softening transition temperature of >140° C.). The rigid foam-forming composition advantageously includes a novel isocyanate-reactive composition containing a flexible polyol and a latent gelling catalyst.

Generally, the PUR foam-forming composition is prepared by mixing two separate components, a first component also referred to herein as an "A-side" component which includes an isocyanate component and a second component also referred to herein as a "B-side" component which includes an isocyanate-reactive component. The A-side and B-side components react when the two components come into contact with each other. Typically, the first and second components react with each other in the presence of normally used additives such as suitable catalysts, suitable surfactants, suitable flame retardants, and suitable blowing agents to form a PUR foam.

One broad embodiment provides a novel PUR foam forming composition including:
(a) at least one isocyanate component;
(b) at least one isocyanate-reactive component comprising an isocyanate-reactive composition including:
(bi) at least one rigid polyol compound having a nominal hydroxyl functionality from 3 to 10 and a hydroxyl number from 125 mg KOH/g to 800 mg KOH/g; and
(bii) at least one flexible polyol compound having a nominal hydroxyl functionality from 2 to 3 and having a hydroxyl number from 20 mg KOH/g to 100 mg KOH/g;
(c) a catalyst package comprising at least one latent gelling catalyst; and
(d) at least one blowing agent;

The use of the polyols combined with a latent gelling catalyst surprisingly results in sufficient cream time, faster demolding, reduced defects, and excellent foam article mechanical performance and improved thermal stability.

In still another embodiment, the present invention the catalyst package includes a (ci) latent gelling catalyst and a (cii) trimerization catalyst; and (d) a blowing agent. The use of composition surprisingly results in a synergistic effect leading to faster demolding with reduced physical defects and with improved mechanical properties and improved thermal stability.

Other embodiments of the present invention relate to a PUR foam made from the above foam-forming composition; and a PUR foam article made from the PUR foam such as an imitation structural construction material.

In still another embodiment, the present invention includes a composite foam article containing fibers such as a woven and/or non-woven fiber mat and the foam-forming composition is provided on the woven and/or non-woven fiber mat. are provided in the form of chopped fibers, continuous tows, mats (both woven and non-woven), and the like.

DETAILED DESCRIPTION

Figure 1:
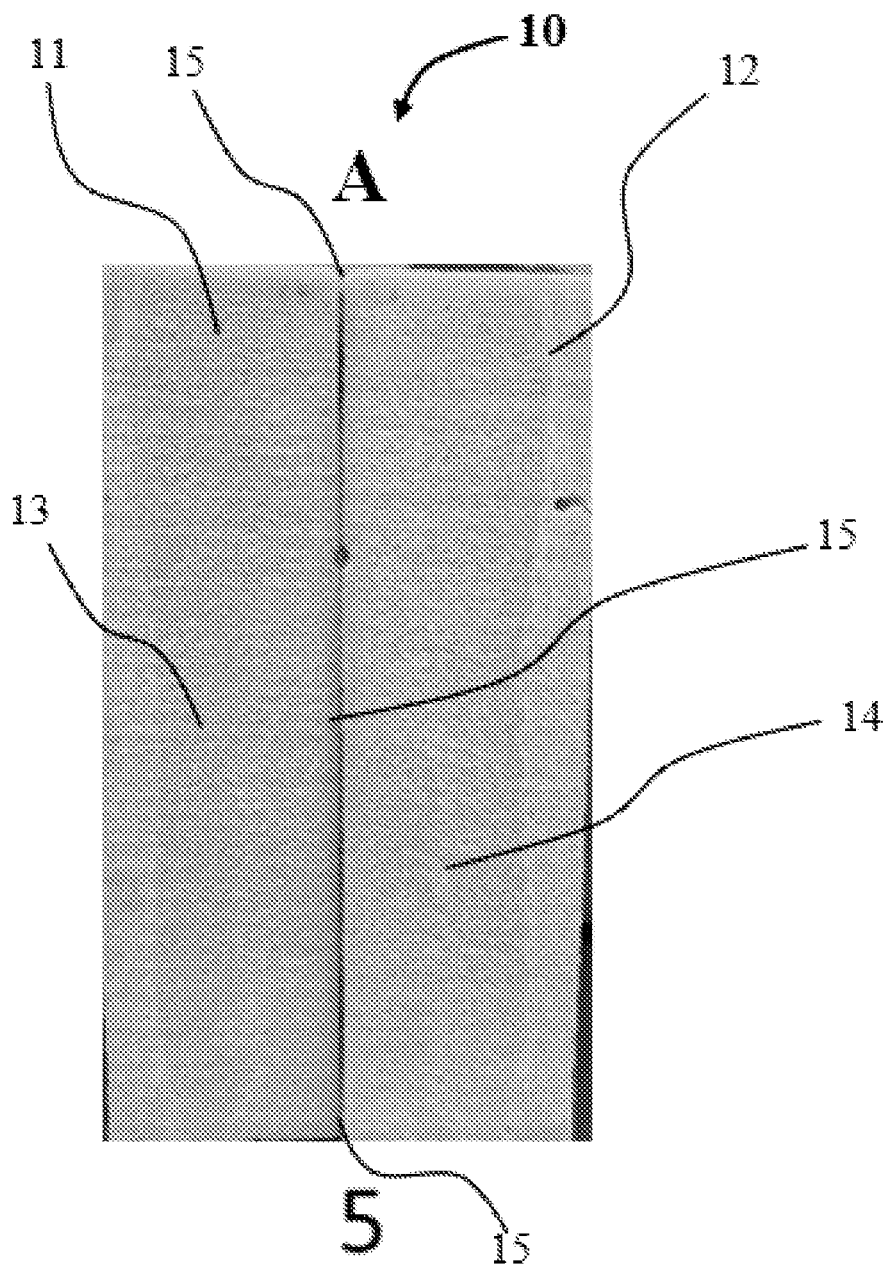
FIG. 1 is a perspective front view of one embodiment of a PUR foam article showing the foam article cut in half and showing the two separate cut pieces placed side by side with the surface of the cut edges of the foam article pieces being shown.

The term "rigid", with reference to a polyol compound, herein means a polyol with a nominal hydroxyl functionality from 3 to 10 and a hydroxyl number from 125 mg KOH/g to 800 mg KOH/g.

The term "flexible", with reference to a polyol compound, herein means a polyol with a nominal hydroxyl functionality from 2 to 3 and having a hydroxyl number from 20 mg KOH/g to 100 mg KOH/g.

"Reduced demolding time", with reference to a foam article, herein means the minimum required residence time of a foam article in a mold is reduced.

"Reduced defects", with reference to a foam article, herein means the number and/or the size of cracks in a foam article are reduced.

"Excellent mechanical performance", with reference to a foam article, herein means the foam article has a flexural modulus of >500 MPa and/or a flexural strength of >12 MPa.

"Improved thermal stability", with reference to a foam article, herein means foam article that has a softening transition temperature of >140° C. when the foam article is made using the foam forming composition of the embodiments.

As used throughout this specification, the abbreviations given below have the following meanings, unless the context clearly indicates otherwise: "=" means "equal to"; @ means "at"; "<" means "less than"; "≤" means "less than or equal to"; ">" means "greater than"; "≥" means "greater than or equal to"; "~" means "approximately"; g=gram(s); mg=milligram(s); kg=kilograms; g/cc=gram(s) per cubic centimeter; kg/m$^3$=kilograms per cubic meter; L=liter(s); mL=milliliter(s); g/L=grams per liter; Mw=Mass molecular weight; m=meter(s); μm=microns: mm=millimeter(s); cm=centimeter(s); min=minute(s); s=second(s); ms=milliseconds; hr=hour(s); mm/min=millimeter(s) per minute; m/s=meter(s) per second; ° C.=degree(s) Celsius; mPa·s=millipascals-seconds; MPa=megapascals; kPa=kilopascals; Pa·s/m$^2$=pascals-seconds per meter squared; mg KOH/g=milligrams potassium hydroxide titrant per gram of product (i.e., hydroxyl number or acid number); cN=centinewton(s); rpm=revolution(s) per minute; kN=kilonewton(s); mm$^2$=millimeter squared; g/10 min=gram(s) per 10 minutes; %=percent; eq %=equivalent percent; vol %=volume percent; pbw=part(s) by weight; g/eq=gram(s) per equivalent; mol/100 g=moles per 100 g of foam forming reaction mixture; Hz=hertz frequency; and wt %=weight percent.

Unless stated otherwise, all percentages, parts, ratios, and like amounts, are defined by weight. For example, all percentages stated herein are weight percentages (wt %), unless otherwise indicated.

Temperatures are in degrees Celsius (° C.), and "ambient temperature" means between 20° C. and 25° C., unless specified otherwise. "Plural" encompasses singular and vice versa; e.g., the singular forms of "a," "an," and "the" include plural referents unless expressly and unequivocally limited to one referent.

As aforementioned, PUR foams are formed by reacting, an A-side component; with a B-side component. The A-side component contains an isocyanate component such as a di- or poly-isocyanate; and the B-side component contains an isocyanate-reactive component such as a polyol having functional groups (OH) that are reactive with the isocyanate functional groups (NCO) of the A-side component.

In one broad embodiment, the rigid foam-forming composition includes, for example, a reactive mixture of the following components: (a) one or more polyisocyanate(s); (b) an isocyanate-reactive composition, as the isocyanate-reactive component, including: (bi) one or more rigid polyol (s), (bii) a flexible polyol, and (biii) optional isocyanate-reactive compounds, if desired; (c) a catalyst package including at least one latent gelling catalyst; and (d) a blowing agent. In addition to the components (a), (b), (c), and (d) above, the foam-forming composition may include: (e) optional compounds or additives such as (ei) additional blowing agent(s) (e.g., pentane); (eii) one or more surfactant(s); (eiii) a cell opener; and (eiv) other optional compounds such a woven and/or non-woven fiber mat (e.g., fiberglass, fiber, filler and the like, if desired). In addition, the catalyst package, component (c), can include other optional catalysts (in addition to the latent gelling catalyst as component (ci)) including, for example, (cii) a trimerization catalyst; and (ciii) a blowing catalyst.

The isocyanate component, component (a) (or the A-side component), can include, for example, one or more isocyanate compounds including for example a polyisocyanate. As used herein, "polyisocyanate" refers to a molecule having, on average, >1.5 isocyanate groups/molecule, e.g., a nominal functionality of >1.5.

The isocyanate compound may be an aliphatic polyisocyanate, a cycloaliphatic polyisocyanate, an araliphatic polyisocyanate, an aromatic polyisocyanate, or combinations thereof. Examples of isocyanates include, but are not limited to, polymethylene polyphenylisocyanate; toluene 2,4-/2,6-diisocyanate (TDI); methylenediphenyl diisocyanate (MDI, including its isomers); polymeric MDI; triisocyanatononane (TIN); naphthyl diisocyanate (NDI); 4,4'-diisocyanatodicyclohexyl-methane; 3-isocyanatomethyl-3,3,5-trimethylcyclohexyl isocyanate (isophorone diisocyanate, IPDI); tetramethylene diisocyanate; hexamethylene diisocyanate (HDI); 2-methyl-pentamethylene diisocyanate; 2,2,4-trimethylhexamethylene diisocyanate (THDI); dodecamethylene diisocyanate; 1,4-diisocyanato-cyclohexane; 4,4'-diisocyanato-3,3'-dimethyl-dicyclohexyl-methane; 4,4'-diisocyanato-2,2-dicyclohexylpropane; 3-isocyanatomethyl-1-methyl-1-isocyanatocyclohexane (MCI); 1,3-diisooctylcyanato-4-methylcyclohexane; 1,3-diisocyanato-2-methylcyclohexane; and combinations thereof, among others. In addition to the isocyanates mentioned above, partially modified polyisocyanates including uretdione, isocyanurate, carbodiimide, uretonimine, allophanate or biuret structure, and combinations thereof, among others, may be utilized.

The isocyanate may be polymeric. As used herein "polymeric", in describing the isocyanate, refers to high molecular weight homologues and/or isomers. For instance, polymeric methylene diphenyl diisocyanate refers to a high molecular weight homologue and/or an isomer of methylene diphenyl diisocyanate.

In another embodiment, the isocyanate component can include an isocyanate prepolymer. The isocyanate prepolymer is known in the art; and in general, is prepared by reacting (1) at least one isocyanate compound and (2) at least one polyol compound.

In various embodiments, the preferred isocyanates are the aromatic polyisocyanates. In embodiments, the isocyanates are, for example, 4,4'-MDI, 2,4'-MDI, polymeric MDI, MDI prepolymer, and mixtures of these.

As aforementioned, the isocyanate may have a nominal isocyanate functionality of >2 isocyanate groups/molecule. For instance, the isocyanate may have a functionality of from 1.5 to 3.50. All individual values and subranges from 1.75 to 3.50 are included; for example, the isocyanate may have a functionality from a lower limit of 1.75, 1.85, or 1.95 to an upper limit of 3.50, 3.40 or 3.30. In other embodiments, the polyisocyanate compound has a number average isocyanate group functionality of at least 2.0 in one embodiment, at least 2.3 in another embodiment, and at least 2.6 in still another embodiment. When the functionality of the polyisocyanate is >3.5, the viscosity of the polyisocyanate is too high for ease of processing. When the functionality of the polyisocyanate is <1.5, the polyisocyanate is less likely to provide sufficient green strength or mechanical performance.

In various embodiments, the isocyanate has a viscosity from 2 mPa·s to 10,000 mPa·s in one embodiment, from 2 mPa·s to 2,500 mPa·s in another embodiment, from 50 mPa·s to 1,500 mPa·s in still another embodiment, from 80 mPa·s to 1,000 mPa·s in yet another embodiment, and from 100 mPa·s to 300 mPa·s in even still another embodiment, when measured using a Brookfield DVE viscometer at 25° C.

For the various embodiments, the isocyanate compound has a number average molecular weight of 150 g/mol to 750 g/mol. Other number average molecular weight values may also be possible. For example, the isocyanate compound can have a number average molecular weight from a low value of 150 g/mol, 200 g/mol, 250 g/mol or 300 g/mol to an upper value of 350 g/mol, 400 g/mol, 450 g/mol, 500 g/mol or 750 g/mol. The number average molecular weight values reported herein are determined by end group analysis, gel permeation chromatography, and other methods as is known in the art. The isocyanate compound can be monomeric and/or polymeric, as are known in the art.

The isocyanate may have an average isocyanate equivalent weight of from 80 g/eq to 400 g/eq. All individual values and subranges from 80 g/eq to 400 g/eq are included; for example, the isocyanate may have an average isocyanate equivalent weight from a lower limit of 80 g/eq, 90 g/eq, or 100 g/eq to an upper limit of 400 g/eq, 390 g/eq, or 380 g/eq. The isocyanate average equivalent weight of the isocyanate ranges from 80 g/eq to 200 g/eq in one embodiment, from 100 g/eq to 175 g/eq in another embodiment, and from 120 g/eq to 150 g/eq in still another embodiment. In some embodiments, when the isocyanate compound is an isocyanate prepolymer resulting from reaction of an isocyanate-reactive compound with a molar excess of a polyisocyanate compound or polymeric isocyanate compound under conditions that do not lead to gelation or solidification, the isocyanate prepolymers can have a higher average isocyanate equivalent weight of >400 g/eq. If the average isocyanate equivalent weight of the isocyanate is >1,000 g/eq, the isocyanate likely is a flexible prepolymer with high viscosity that is less likely to provide ease of processing, sufficient foam green strength, or mechanical performance.

The isocyanate used may be prepared by a known process. For instance, a polyisocyanate may be prepared by phosgenation of corresponding polyamines with formation of polycarbamoylchlorides and thermolysis thereof to provide the polyisocyanate and hydrogen chloride; or in another embodiment, the polyisocyanate may be prepared by a phosgene-free process, such as by reacting the corresponding polyamines with urea and alcohol to give polycarbamates, and thermolysis thereof to give the polyisocyanate and alcohol, for example.

The isocyanate may be obtained commercially. Examples of commercial isocyanates include, but are not limited to, polyisocyanates under the trade names VORANATE™, PAPI®, and ISONATE™, such as VORANATE™ M 220, and PAPI™ 27, all of which are available from Dow Inc., among other commercial isocyanates.

The amount of isocyanate compound used in the reactive foam-forming composition can be, for example, from 30 wt % to 80 wt % in one embodiment, from 35 wt % to 75 wt % in another embodiment, from 40 wt % to 70 wt % in still another embodiment, and from 45 wt % to 65 wt % in yet another embodiment.

In one embodiment, the isocyanate-reactive component, component (b) (or the B-side composition) can comprise an isocyanate-reactive composition including a mixture, combination or blend of: (bi) one or more rigid polyol compound (s), (bii) one or more flexible polyol compound(s) and (biii) one or more optional isocyanate-reactive compounds that are not (bi) or (bii), if desired; (c) a catalyst package; and (d) a blowing agent.

The rigid polyol compound, component (bi), can be, for example, one or more compounds reactive with the isocyanate compound, component (a), present in the A-side component. The rigid polyol compound includes, for example, a polyether polyol, a polyester polyol, a polyester ether polyol, a polycarbonate polyol, a polyacrylate polyol, a polycaprolactone polyol, a natural oil polyol, and blends thereof. Other isocyanate-reactive compounds can include, for example, polyamines that are primary or secondary amines; polyether amines where the amines are primary or secondary amines; hydroxylamino compounds where the amine(s) are primary or secondary amine(s); polycarboxylic acids; and mixtures thereof. Rigid polyols in some embodiments is one or more polyether polyols. Such a polyether polyol may be a homopolymer of an alkylene oxide such as ethylene oxide; 1,2-propylene oxide; 1,2-butylene oxide; 2,3-butylene oxide and tetrahydrofuran; or a copolymer of two or more alkylene oxides. If the rigid polyol is a copolymer, the polyether polyol may be a block and/or a random copolymer as well as a capped copolymer. Homopolymers of propylene oxide, copolymers of propylene oxide with up to 30% by weight ethylene oxide, based on the weight of all alkylene oxides, and random and/or block copolymers of propylene oxide and butylene oxide are useful.

The rigid polyols include compounds having a number of hydroxyl groups per molecule in the range of from 2 to 10 in one embodiment, from 2 to 8 in another embodiment, and from 3 to 7 in still another embodiment; and the rigid polyols include compounds having a HEW of from 69 to <500 in one embodiment, from 75 to 375 in another embodiment, from 80 to 250 in still another embodiment, and from 85 to 160 in yet another embodiment. Polyether polyols via the polymerization of oxirane/cyclic ethers, such as ethylene oxide, propylene oxide, butylene oxide, styrene oxide or epichlorohydrin, can be effected either individually, in the presence of $BF_3$, or by a process of chemical addition of these oxiranes, optionally as mixtures (such as mixtures of ethylene oxide and propylene oxide) or successively, to starting components (with appropriate catalysts such as, but not limited to, potassium hydroxide, double metal cyanides (DMC) and other known catalysts) having reactive hydrogen atoms (also known as alkoxylations), such as water, ammonia, alcohols, or amines. The reactive hydrogen atom compounds used for alkoxylations/polymerizations can include, for example, glycerin, ethylene glycol, propylene glycol, dipropylene glycol, diethylene glycol, sorbitol, sucrose, volemitol, threitol, ribitol, mannitol, maltitol, iditol, fucitol, galactitol, Novolac, arabitol, erythritol, pentaerythritol, trimethylolpropane, and mixtures thereof. When the reactive hydrogen atom compounds used for alkoxylations/polymerizations are amines, for example ethylene diamine, diethylenetriamine, or o-toluenediamine the rigid polyol is considered to be an autocatalytic polyether polyol.

In various embodiments, the rigid polyol is a polyether polyol that is a block, a random, and/or a capped copolymer of propylene oxide and ethylene oxide. In one embodiment, the copolymer polyether polyol comprises up to 30 wt % ethylene oxide, based on the weight of all alkylene oxides.

In another embodiment, the copolymer polyether polyol comprises up to 20 wt % ethylene oxide, based on the weight of all alkylene oxides. In still another embodiment, the copolymer polyether polyol comprises up to 10 wt % ethylene oxide, based on the weight of all alkylene oxides.

In one embodiment, the rigid polyol is a polyether polyol from alkoxylation with only propylene oxide. In another embodiment, the rigid polyol compound can include a polyether polyol, alkoxylated glycerin, alkoxylated sucrose, and alkoxylated sorbitol, alkoxylated trimethylopropane with alkoxylation by propylene oxide and/or ethylene oxide with a HEW from 69 to <500, and mixtures thereof. In still another embodiment, the rigid polyol compound is a non-autocatalytic polyether polyols and mixtures thereof. In still another embodiment, the rigid polyol compound includes a mixture of two or more polyether polyols from alkoxylation with propylene oxide.

In one embodiment, one or more different rigid polyols may be used. For example, the rigid polyol may be one of the following which may be used alone or in various combinations: (1) a first rigid polyether polyol having a nominal hydroxyl functionality of 5 and a hydroxyl number from 300 mg KOH/g to 450 mg KOH/g (e.g., 300 mg KOH/g to 400 mg KOH/g; 325 mg KOH/g to 400 mg KOH/g; 350 mg KOH/g to 375 mg KOH/g, etc.) (2) a first rigid polyether polyol having a nominal hydroxyl functionality of 7 and a hydroxyl number from 300 mg KOH/g to 450 mg KOH/g (e.g., 300 mg KOH/g to 400 mg KOH/g; 325 mg KOH/g to 400 mg KOH/g; 360 mg KOH/g to 390 mg KOH/g, etc.); and (3) a first rigid polyether polyol having a nominal hydroxyl functionality of 3 and a hydroxyl number from 600 mg KOH/g to 800 mg KOH/g (e.g., 600 mg KOH/g to 750 mg KOH/g; 625 mg KOH/g to 700 mg KOH/g; 645 mg KOH/g to 675 mg KOH/g, etc.).

If present, the first rigid polyether polyol may be present in an amount from 5 wt % to 50 wt %, from 20 wt % to 50 wt %, 30 wt % to 50 wt %, 35 wt % to 45 wt %, and/or 40 wt % to 45 wt %, based on a total weight of composition for forming the isocyanate-reactive component .composition. If present, the second rigid polyether polyol may be present in an amount from 5 wt % to 50 wt %, from 5 wt % to 30 wt %, 5 wt % to 25 wt %, 10 wt % to 20 wt %, and/or 10 wt % to 15 wt %, based on a total weight of composition for forming the isocyanate-reactive component. If present, the third rigid polyether polyol may be present in an amount from 5 wt % to 50 wt %, from 5 wt % to 40 wt %, 10 wt % to 35 wt %, 10 wt % to 25 wt %, and/or 15 wt % to 20 wt %, based on a total weight of composition for forming the isocyanate-reactive component.

In yet another embodiment, the rigid polyol compound can include commercially available compounds such as VORANOL™ 360, (a polyether polyol); VORANOL™ 225, (a polyether polyol); VORANOL™ 370, (a polyether polyol); and mixtures thereof. The above VORANOL™ compounds are all available from Dow Inc.

The amount of rigid polyol compound used in the isocyanate-reactive composition can be, for example, from 50 wt % to 95 wt % in one embodiment, from 60 wt % to 90 wt % in another embodiment and from 65 wt % to 85 wt % in still another embodiment, based on the total weight of the components in the isocyanate-reactive composition, component (b). As aforementioned, if the amount of rigid polyol compound (optionally including polyol chain extenders and crosslinkers) used is too much, i.e., >95 wt %, a long minimum demolding time may be required and/or the foam article produced may have defects and property performance issues.

The flexible polyol compound, component (bii), includes, for example, one or more compounds reactive with the isocyanate compound, component (a), present in the A-side component. The flexible polyol compound includes, for example, a polyether polyol, a polyester polyol, a polyester ether polyol, a polycarbonate polyol, a polyacrylate polyol, a polycaprolactone polyol, a natural oil polyol, and blends thereof.

The flexible polyols used in some embodiments includes one or more polyether polyols. Such a polyether polyol may be a homopolymer of an alkylene oxide such as ethylene oxide, 1,2-propylene oxide, 1,2-butylene oxide, 2,3-butylene oxide and tetrahydrofuran, or a copolymer of two or more alkylene oxides. If a copolymer, a polyether polyol may be a block and/or random copolymer as well as a capped copolymer. Homo-polymers of propylene oxide, copolymers of propylene oxide with up to 30% by weight ethylene oxide, based on the weight of all alkylene oxides, and random and/or block copolymers of propylene oxide and butylene oxide are useful. The flexible polyols include compounds having from at least 2 to ≤4 hydroxyl groups per molecule in one embodiment, and from 2 to 3 hydroxyl groups per molecule in another embodiment; and having an equivalent weight of from 500 to 2,800 in one embodiment, from 650 to 2,000 in another embodiment, and from 800 to 1,500 in still another embodiment. Polyether polyols via the polymerization of oxirane/cyclic ethers, such as ethylene oxide, propylene oxide, butylene oxide, styrene oxide or epichlorohydrin, can be effected either on their own, in the presence of $BF_3$, or by a process of chemical addition of these oxiranes, optionally as mixtures (such as mixtures of ethylene oxide and propylene oxide) or successively, to starting components (with appropriate catalysts such as, but not limited to potassium hydroxide, double metal cyanides (DMC) and other known catalysts) having reactive hydrogen atoms (also known as alkoxylations), such as water, ammonia, alcohols, or amines Examples of these reactive hydrogen atom compounds used for alkoxylations/polymerizations can include, for example, glycerin, ethylene glycol, propylene glycol, dipropylene glycol, diethylene glycol, sorbitol, sucrose, volemitol, threitol, ribitol, mannitol, maltitol, iditol, fucitol, galactitol, Novolac, arabitol, erythritol, pentaerythritol, trimethylolpropane, and mixtures thereof. When the reactive hydrogen atom compounds used for alkoxylations/polymerizations are amines, for example ethylene diamine or o-toluenediamine the polyol is considered to be an autocatalytic polyether polyol.

In various embodiments, the flexible polyol compound is a polyether polyol that is a block, a random, and/or a capped copolymer of propylene oxide and optionally ethylene oxide. In one embodiment, the copolymer polyether polyol comprises up to 30 wt % ethylene oxide, based on the weight of all alkylene oxides. In one embodiment, the flexible polyol compound is a polyether polyol from alkoxylation with only propylene oxide.

In one embodiment, the flexible polyol compound can include polyether polyols, alkoxylated ethylene glycol, polyethylene glycol, polypropylene glycol, alkoxylated propylene glycol, alkoxylated glycerol, with alkoxylation by propylene oxide and/or ethylene oxide, and mixtures thereof; and the flexible polyol compound can have an equivalent weight ranging from 500 to 2,800. In one embodiment, the flexible polyol compound is a non-auto-catalytic polyether polyol.

In another embodiment, the flexible polyol compound can include commercially available polyol compounds such as VORANOL™ 220-056N (available from Dow Inc); and VORANOL™ 230-056 (also available from Dow Inc.), and mixtures thereof.

The flexible polyol has a hydroxyl number from 20 mg KOH/g to 100 mg KOH/g in one general embodiment, from 28 mg KOH/g to 87 mg KOH/g in another embodiment, from 35 mg KOH/g to 72 mg KOH/g in still another embodiment, and from 50 mg KOH/g to 60 mg KOH/g in still another embodiment. The flexible polyol has a nominal hydroxyl functionality from 2 to 3.

The amount of flexible polyol compound used in the isocyanate-reactive composition can be, for example: from 5 wt % to 50 wt % in one embodiment, from 10 wt % to 40 wt % in one embodiment, from 20 wt % to 40 wt % in another embodiment, and from 25 wt % to 35 wt % in still another embodiment, based on the total weight of the components in the isocyanate-reactive composition, component (b).

In one embodiment, at least one of the catalysts in a catalyst package (c) is a latent gelling catalyst which includes thermolatent and/or delayed action catalysts. These catalysts are sometimes described as "blocked catalyst" or "back-end cure catalyst". The latent catalyst is often a subset of tertiary amine gelling catalysts that are typically, but not limited to, salts or complexes of a tertiary amine catalyst.

In an embodiment, a catalyst package (c), is used in preparing the foam-forming composition. The catalyst package is generally present in the isocyanate-reactive composition. The catalyst package can also be added as a separate stream into the reaction mixture of isocyanate and isocyanate-reactive composition. The catalyst package is present in an amount sufficient to provide the reaction mixture with 0.1 wt % to 3.0 wt % of the catalysts based on the total weight of the reaction mixture. The catalyst can be selected from the group consisting of organic tertiary amines, tertiary phosphines, quaternary ammonium salts, potassium acetates, metal alkanoates, a urethane-based catalyst and combinations thereof as well as others known in the art. The catalyst can also include organometallic catalysts such as organo-tin compounds, organo-zinc compounds, organo-mercury compounds as are known in the art.

For the various embodiments, the catalyst in a catalyst package may be a blowing catalyst, a gelling catalyst, a trimerization catalyst, or combinations thereof with combination preferred. As used herein, blowing catalysts and gelling catalysts, may be differentiated by a tendency to favor either the urea (blow) reaction, in the case of the blowing catalyst, or the urethane (gel) reaction, in the case of the gelling catalyst. A trimerization catalyst may be utilized to promote the isocyanurate forming reaction in the compositions.

Any blowing catalyst, e.g., one that favor the blowing reaction, may be used. Examples of blowing catalysts, include, but are not limited to: bis-(2-dimethylaminoethyl) ether; N,N,N',N'',N''-pentamethyldiethylenetriamine, triethylamine, tributyl amine, N,N-dimethylaminopropylamine, dimethylethanolamine, N,N,N',N'-tetra-methylethylenediamine, and combinations thereof, among others. An example of a commercial blowing catalyst is POLYCAT® 5, from Evonik, among other commercially available blowing catalysts.

Any gelling catalyst, e.g., catalyst that may tend to favor the gel reaction, may be used. Examples of gelling catalysts include, but are not limited to, organometallic compounds, cyclic tertiary amines and/or long chain amines, e.g., that contain several nitrogen atoms and combinations thereof. Organometallic compounds include organotin compounds, such as tin(II) salts of organic carboxylic acids, e.g., tin(II) diacetate, tin(II) dioctanoate, tin(II) diethylhexanoate, and tin(II) dilaurate, and dialkyltin(IV) salts of organic carboxylic acids, e.g., dibutyltin diacetate, dibutyltin dilaurate, dibutyltin maleate and dioctyltin diacetate. Bismuth salts of organic carboxylic acids may also be utilized as the gelling catalyst, such as, for example, bismuth octanoate. Cyclic tertiary amines and/or long chain amines include dimethylbenzylamine, triethylenediamine, and combinations thereof. Examples of a commercially available gelling catalysts are POLYCAT® 8, DABCO® 33-LV, and DABCO® T-12 from Evonik, among other commercially available gelling catalysts.

Suitable trimerization catalysts include any such catalysts known in the art. Examples of trimerization catalysts include, but not limited to, N,N',N''-tris(3-dimethylaminopropyl)hexahydro-S-triazine; N,N-dimethylcyclo-hexylamine; 1,3,5-tris(N,N-dimethylaminopropyl)-s-hexahydrotriazine; [2,4,6-tris (dimethylaminomethyl) phenol]; potassium acetate, potassium octoate; tetraalkylammonium hydroxides such as tetramethylammonium hydroxide; alkali metal hydroxides such as sodium hydroxide; alkali metal alkoxides such as sodium methoxide and potassium isopropoxide; and alkali metal salts of long-chain fatty acids having 10 carbon atoms to 20 carbon atoms, and combinations thereof, among others. Some commercially available trimerization catalysts include, for example, DABCO® TMR-2, DABCO® TMR-20, DABCO® TMR-30, DABCO® TMR-7, DABCO® K 2097; DABCO® K15, POLYCAT® 41, and POLYCAT® 46, each from Evonik, among other commercially available trimerization catalysts. Some preferred trimerization catalysts include, for example, DABCO® TMR-20 and POLYCAT® 46; and mixtures thereof.

In one embodiment, at least one of the catalysts used in the foam-forming composition is a latent gelling catalyst. The term "latent catalyst" refers to a catalyst compound that is of low catalytic activity or is relatively inactive at ambient temperatures, and which becomes more catalytically active, such as by disassociation, decoordination, ring opening, ionization, or tautomerization upon heating to effect catalysis of least one of the chemical reactions involved in making a PUR foam. Ambient temperature typically ranges from 60° F. to 90° F. (15.6° C. to 32.2° C.), such as a typical room temperature, 73° F. (23° C.).

Latent/delayed action catalysts can be gelling, blowing, and/or trimerization types of catalysts in terms of their function in the foaming process. The latent catalyst is often a subset of tertiary amine gelling catalysts that are typically, but not limited to, acid salts, phenolic salts, or complexes of a tertiary amine catalyst where the acid or phenolic is often a carboxylic acid or phenol species, but not limited to, such as formic acid, acetic acid, propionic acid, 2-ethylhexanoic acid, phenoxyacetic acid, gluconic acid, tataric acid, citric acid, phenol, nonylphenol, diisopropyl phenol, and the like; and mixtures thereof. Some useable commercially available latent catalysts include, for example, DABCO® TMR-30, POLYCAT® SA2 LE, POLYCAT® SA-1/10, DABCO® 8154, NIAX™ A-107, NIAX™ C-31, NIAX™ C-225, JEFFCAT™ ZF-54, JEFCAT™ LED-204; and mixtures thereof.

In a broad embodiment for example, the catalyst used can be a single catalyst or a catalyst package comprising a plurality of catalysts. In one embodiment for example, at least one of the catalysts used is a trimerization catalyst. In another embodiment for example, a catalyst package is used comprising at least one latent gelling catalyst and at least one trimerization catalyst. For example, in still another embodiment, the catalyst is a catalyst package including: at least one gelling catalyst including one or more (ci) latent gelling catalyst at a concentration of 1.0 wt % to 100 wt % (e.g., 5 wt % to 50 wt %, 10 wt % to 30 wt %, etc.), (cii) a trimerization catalyst at a concentration of 0 wt % to 99 wt % (e.g., 20 wt % to 80%, 30 wt % to 50 wt %, etc.), and (ciii) a blowing catalyst at a concentration of from 0 wt % to 50 wt % based on the total weight of the catalyst package (e.g., 5 wt % to 50 wt %, 20 wt % to 40 wt %, etc.). A weight ratio of the trimerization catalyst compound to the gelling catalyst compound may be from 0.2 to 10.0 (e.g., 1.0 to 10.0, 2.0 to 7.0, 2.0 to 5.0, 2.0 to 4.0, 2.0 to 3.0, etc.).

The amount of gelling catalyst compound used in the composition can be, for example, from 0.01 wt % to 3 wt % in one embodiment, from 0.05 wt % to 2 wt % in another embodiment, from 0.08 wt % to 1.5 wt % in still another embodiment, and from 0.1 wt % to 1.0 wt % in yet another embodiment, based on the total weight of the PUR foam forming composition.

The amount of trimerization catalyst compound, component (cii), used can be, for example, from 0 wt % of 2.0 wt % in one embodiment, from 0.1 wt % to 1.5 wt % in another embodiment, from 0.15 wt % to 1.0 wt % in still another embodiment, and from 0.2 wt % to 0.8 wt % in yet another embodiment, based on the total weight of the PUR foam forming composition.

The amount of blowing catalyst compound, component (ciii), can be, for example, from 0 wt % to 3.0 wt % in one embodiment, from 0 wt % to 2.0 wt % in another embodiment, from 0 wt % to 1.0 wt % in still another embodiment, and from 0.001 wt % to 0.8 wt % in yet another embodiment, based on the total weight of the polyurethane foam forming composition.

For the various embodiments, at least one blowing agent can be present in the isocyanate-reactive composition in amount sufficient to provide the reaction mixture with 0.05 wt % to 10 wt % of the blowing agent based on the total weight of the foam forming reaction mixture.

Various blowing agents are known in the art and can be selected for use from the group of water, volatile organic substances, dissolved inert gases and combinations thereof. Examples of blowing agents include hydrocarbons such as butane, isobutane, 2,3-dimethylbutane, n- and i-pentane isomers, hexane isomers, heptane isomers and cycloalkanes including cyclopentane, cyclohexane, cycloheptane; hydroflurocarbons such as HCFC-142b (1-chloro-1,1-difluoroethane), HCFC-141b (1,1-dichloro-1-fluoroethane), HCFC-22 (chlorodifluoro-methane), HFC-245fa (1,1,1,3,3-pentafluoropropane), HFC-365mfc (1,1,1,3,3-penta-fluorobutane), HFC 227ea (1,1,1,2,3,3,3-heptafluoropropane), HFC-134a (1,1,1,2-tetrafluoroethane), HFC-125 (1,1,1,2,2-pentafluoroethane), HFC-143 (1,1,2-trifluoroethane), HFC 143A (1,1,1-trifluoroethane), HFC-152 (1,1-difluoroethane), HFC-227ea (1,1,1,2,3,3,3-heptafluoropropane), HFC-236ca(1,1,2,2,3,3-hexafluoropropane), HFC 236fa (1,1,1,3,3,3-hexafluoroethane), HFC 245ca (1,1,2,2,3-pentafluoropentane), HFC 356mff (1,1,1,4,4,4-hexafluorobutane), HFC 365mfc (1,1,1,3,3-pentafluorobutane); hydrofluoroolefins such as cis-1,1,1,4,4,4-hexafluoro-2-butene, 1,3,3,3-tetrafluoropropene, trans-1-chloro-3,3,3-trifluoropropene; a chemical blowing agent such as formic acid and water. The blowing agent can also include, for example, other volatile organic substances such as ethyl acetate; halogen substituted alkanes, such as methylene chloride, chloroform, ethylidene chloride, vinylidene chloride, monofluorotrichloromethane, chlorodifluoromethane, dichlorodifluoromethane; butane; hexane; heptane; diethyl ether and mixtures thereof. The blowing agent can also include, for example, gases such as nitrogen; air; carbon dioxide; and mixtures thereof.

For the various embodiments, at least one blowing agent can be present in the isocyanate-reactive composition. The amount of blowing agent ranges from 0.002 moles per 100 g of the foam forming reaction mixture (mol/100 g) to 0.20 mol/100 g in one embodiment; ranges from 0.005 mol/100 g to 0.15 mol/100 g in another embodiment; and ranges from 0.01 mol/100 g to 0.10 mol/100 g in still another embodiment.

In one embodiment, at least one blowing agent is water. In another embodiment, water is the sole blowing agent; and ranges from 0.05 wt % to 1.0 wt % in one general embodiment, from 0.08 wt % to 0.9 wt % in another embodiment, and from 0.1 wt % to 0.8 wt % in still another embodiment, based on the total weight of the foam forming composition. In still another embodiment, water is the sole blowing agent; and ranges from 0.0025 mol/100 g to 0.060 mol/100 g in one embodiment; from 0.004 mol/100 g to 0.050 mol/100 g in another embodiment; from 0.005 mol/100 g to 0.045 mol/100 g in still another embodiment; and from 0.008 mol/100 g to 0.040 mol/100 g in yet another embodiment.

In addition to the above components (bi), and (bii) comprising the isocyanate-reactive composition (b), the isocyanate-reactive composition may also include other additional optional isocyanate-reactive compounds, component (biii), that are different from compounds (bi) and (bii). Other isocyanate-reactive compounds, component (biii), can include, for example, polyamines that are primary or secondary amines, polyether amines where the amines are primary or secondary amines, hydroxylamino compounds where the amine(s) are primary or secondary amine(s), and polycarboxylic acids, and mixtures thereof. The one or more optional isocyanate-reactive compound (biii) that are different from compounds (bi) and (bii), in terms of HEW or nominal functionality, can be any number of protic containing species including polyols, polyamines that are primary or secondary amines, polyether amines where the amines are primary or secondary amines, hydroxylamino compounds where the amine(s) are primary or secondary amines, and polycarboxyl acids and mixtures thereof. Specific categories of optional isocyanate-reactive compounds (biii) are known as chain extenders as well as crosslinkers. Chain extenders are low molecular weight diols or diamines (i.e., a nominal functionality of 2) that react with isocyanates to build PU molecular weight and increase the block length of the hard segments and are characterized as having a nominal functionality of 2 and a HEW of from 30 to <69. Examples of chain extenders include, but are not limited to, ethylenediamine; ethylene glycol; 1,4-butanediol; 1,6-hexanediol; and the like; and mixtures thereof.

Crosslinkers are low molecular weight triols or triamines or higher nominal functionality polyols or polyamines that react with isocyanates to build a PU crosslinked network with higher crosslink density than compound (bi) and are characterized as having a nominal functionality of at least 3 and as much as 4 with a HEW of from 30 to <69. Examples of crosslinkers include, but are not limited to, glycerol; trimethylolpropane; 1,2,6-hexanetriol; pentaerythritol; and the like; and mixtures thereof. Optional isocyanate-reactive compounds (biii) such as chain extenders and crosslinkers are sometimes utilized to dilute and/or dissolve one or more catalysts in a catalyst package (c). In some embodiments, the optional isocyanate-reactive compound (biii) with a HEW of from 30 to <69 and a nominal functionality of from 2 to 4 is used as a isocyanate-reactive compound; and is utilized from 0 wt % to 1.5 wt % in one embodiment, from 0 wt % to 1.0 wt % in another embodiment; and from 0.001 wt % to 0.5 wt % in still another embodiment, based on the total weight of the polyurethane foam forming composition.

In addition to the above components (a), (b), (c), and (d) in the reactive foam-forming mixture, the reactive mixture may also include other additional optional auxiliary components, compounds, agents or additives as a component (e). Such optional component(s) may be added to the reactive mixture with any of components (a) and/or (b); or as a separate addition as another component stream or as a discrete material to the mold into which the reactive foam-forming mixture is loaded. The optional auxiliary components, compounds, agents or additives can include one or more optional compounds known in the art for their use or function. For example, the optional component (e) can include, but not limited to, expandable graphite, additional physical or chemical blowing agents, fillers, fibers, flame retardants, cell openers, emulsifiers, antioxidants, surfactants, colorants, UV stabilizers, antistatic agents, bacteriostats, and mixtures thereof.

For various embodiments, the (cii) surfactant agent when used can be present in the isocyanate-reactive composition in amount sufficient to provide the reaction mixture with 0.1 wt % to 5 wt % of the surfactant agent based on the total weight of the foam forming reaction mixture. Examples of suitable surfactants include silicone-based surfactants and organic-based surfactants. Some representative materials are, generally, polysiloxane polyoxylalkylene block copolymers, such as those disclosed in U.S. Pat. Nos. 2,834,748; 2,917,480; and 2,846,458. Also included are organic surfactants containing polyoxyethylene-polyoxybutylene block copolymers, as are described in U.S. Pat. No. 5,600,019. Other surfactants include polyethylene glycol ethers of long-chain alcohols, tertiary amine or alkanolamine salts of long-chain allyl acid sulfate esters, alkylsulfonic esters, alkyl arylsulfonic acids, and combinations thereof. Some commercially available surfactants useful in the isocyanate-reactive composition include VORASURF™ DC 193, VORASURF™ 504, TEGOSTAB® B8418, and mixtures thereof.

In general, the amount of optional compound used to add to the foam forming reactive mixture can be, for example, from 0 wt % to 10 wt % in one embodiment, from 0.1 wt % to 8 wt % in another embodiment, from 0.3 wt % to 6 wt % in still another embodiment, and from 0.5 wt % to 5 wt % in yet another embodiment.

In a broad embodiment, the process for producing the isocyanate-reactive composition includes a mixing, combining or blending: (bi) at least one rigid polyol compound; (bii) at least one flexible polyol compound; (c) a catalyst package; (d) a blowing agent; (biii) optional isocyanate-reactive compounds; (e) optional compounds or additives such as (ei) additional blowing agent(s) (e.g., pentane); (eii) one or more surfactant(s); (eiii) a cell opener; and (eiv) other optional compounds such as flame retardants, fiberglass, fiber, filler and the like, if desired, under process conditions using any known mixing techniques such that the above compounds are thoroughly mixed together to form the isocyanate-reactive composition.

In another embodiment, the isocyanate-reactive composition comprises (bi), (bii), (c), (d), and (e) other optional components, wherein (c) the catalyst package includes a (ci) latent gelling catalyst and a (cii) trimerization catalyst. These materials will also be mixed, combined, blended much like the polyol components.

The nominal functionality of isocyanate-reactive groups in the isocyanate-reactive composition (b) is from 2 to 6 in one embodiment, from 2.5 to 5.5 in another embodiment, and from 3 to 5 in still another embodiment.

The viscosity at 25° C. of the isocyanate-reactive composition (b) is from 400 mPa·s to 4,000 mPa·s in one embodiment; from 500 mPa·s to 3,000 mPa·s in another embodiment; from 650 mPa·s to 2,500 mPa·s in another embodiment, and from 800 mPa·s to 2,000 mPa·s in still another embodiment. The viscosity can be measured by Brookfield DVE viscometer at 25° C.

As aforementioned, the process for producing a PUR foam-forming composition generally includes admixing: (a) at least one isocyanate component as the A-side component; (b) at least one isocyanate-reactive composition as the B-side composition; wherein the B-side composition comprises an isocyanate-reactive composition of: (bi) at least one rigid polyol compound; (bii) at least one flexible polyol compound; (c) a catalyst package; and (d) a blowing agent (e.g. water); and (e) additional optional components, if desired. The A-side and B-side above are mixed together under process conditions such that the reactive components are thoroughly mixed together to form a uniform reactive PUR foam-forming composition using any known mixing techniques and devices as are known in the art, including impingement mixing.

In one embodiment, all of the components, ingredients and the optional ingredients, if any, except the isocyanate compounds, can be mixed together as an isocyanate-reactive composition (B-side). Polyisocyanate component (A-side) and the isocyanate-reactive composition (B-side) are then mixed in the desired concentrations to prepare the final PUR foam-forming composition.

In another embodiment, the polyisocyanate component (A-side), the isocyanate-reactive composition (B-side), and at least one of the components, ingredients and the optional ingredients, if any, are mixed together with the desired concentrations to prepare the final PUR foam-forming composition.

In another embodiment, at least one of the components, ingredients and the optional ingredients, if any, is admixed with the polyisocyanate component (A-side) and then mixed with the isocyanate-reactive composition (B-side) in the desired concentrations to prepare the final PUR foam-forming composition.

The mixing of the components can be carried out at a temperature of from 5° C. to 80° C. in one embodiment; from 15° C. to 60° C. in another embodiment; from 20° C. to 40° C. in still another embodiment, and from 20° C. to 30° C. in yet another embodiment.

The isocyanate index equals the ratio of isocyanate groups to isocyanate-reactive groups (such as OH groups) multiplied by 100. In the present invention, the foam forming composition has an isocyanate index range of from 90 to 400 in one embodiment, from 95 to 300 in another embodiment, and from 100 to 200 in still another embodiment. It is found that when using the formulation according to the embodiments even at low index values, a highly dense material useable for initiation construction materials may be obtained. When isocyanate is used in excess, the isocyanate can react in part with itself, resulting in heavily cross-linked synthetic material with ring-like isocyanurate structure also known as trimer structures. The formation of isocyanurate structure can be promoted by including a trimerization catalyst in the foam forming composition.

In one embodiment, the isocyanate index is ≥90 and <110. The foam forming composition comprises an isocyanate composition and an isocyanate-reactive composition. The isocyanate-reactive composition comprises (bi) at least one rigid polyol compound; (bii) at least one flexible polyol compound; (c) a catalyst package having at least one latent gelling catalyst; and (d) a blowing agent (e.g., water); and (e) additional optional components, if desired.

In another embodiment, the isocyanate index is ≥110 to 210. The foam forming composition comprises an isocyanate component and an isocyanate-reactive composition. The isocyanate-reactive composition comprises (bi) at least one rigid polyol compound; (bii) at least one flexible polyol compound; (c) a catalyst package having at least one latent gelling catalyst and a trimerization catalyst; and (d) a blowing agent (e.g., water); and (e) additional optional components, if desired.

The cream time of a foam forming composition is defined as the time from the preparation of the reaction mixture until the recognizable beginning of the foaming mixture such as a visual change of the reactants (color change and/or start of rise) occurs. It is desirable for the foam forming composition to have sufficient cream time for some processes such as structural reaction injection molding (S-RIM). A sufficient cream time allows the liquid foam forming composition to fill the mold cavity and wet the optional fibers, if any, prior to excessive viscosity increase or foaming. The foam forming composition of the present invention has a cream time ≥20 s in one embodiment, ≥30 s in another embodiment, ≥35 s in still another embodiment, and ≥40 s in yet another embodiment. The foam forming composition of the present invention has a cream time of ≤150 s in one embodiment, ≤130 s in another embodiment, ≤120 s in still another embodiment, and ≤100 s in yet another embodiment.

The density of the free rise foam or free rise density (FRD) prepared from the foam forming composition in this invention is from 25 kg/m$^3$ to 300 kg/m$^3$ in one embodiment; from 60 kg/m$^3$ to 240 kg/m$^3$ in another embodiment; from 75 kg/m$^3$ to 200 kg/m$^3$ still in another embodiment; and from 85 kg/m$^3$ to 160 kg/m$^3$ yet in another embodiment.

In a general embodiment, the process of the present invention for producing a PUR foam product includes the steps of: (1) equilibrating the A-side polyisocyanate component and B-side isocyanate-reactive composition to the mixing temperature (generally, for example, room temperature which is approximately 23° C.); (2) ensuring all mold surfaces are clean and covered with sufficient mold release; (3) preheating the upper and lower plaque of the mold surface to the molding temperature (generally, for example, between 25° C. to 60° C.) with optional woven and non-woven glass or carbon fibers (e.g., fiber mats, meshes or preforms) placed in the mold; (4) determining the loading quantity of foam forming reaction mixture to achieve the desired overpacking ratio (generally, for example from 150% to 400%); (5) mixing the A-side isocyanate component and the B-side isocyanate-reactive composition thoroughly and quickly within 10 s; (6) starting a timer at the beginning of the mixing step (5); (7) transferring the foam forming reaction mixture to the mold immediately or directly injecting the foam forming reaction mixture into the mold; (8) closing the mold (if not a closed mold) and allowing the resulting foam-forming reaction mixture to react to form a PUR foam article in the mold (i.e., a molded foam article); (9) opening the mold after reaching the preset demolding time; (10) demolding the foam article; and (11) after completely demolding the foam article, inspecting the foam article by visually observing the foam article for defects such as swelling, shrinkage, bulging, and cracking, if any.

Processes for preparing a PUR foam article can be achieved through any known process techniques in the art. In general, the PUR foam article of the present disclosure may be produced by continuous or discontinuous processes, including the process referred to generally as the reaction injection molding (RIM) process or casting molding process with the foaming reaction and subsequent curing being carried out in molds.

The mixing of the components of the foam forming composition can be carried out at a temperature of from 5° C. to 80° C. in one embodiment; from 10° C. to 60° C. in another embodiment; and from 15° C. to 40° C. in another embodiment, and from 20° C. to 30° C. still in another embodiment. The molding of PUR foam articles can be performed at a mold temperature range from 20° C. to 80° C. in one embodiment, from 30° C. to 70° C. in another embodiment, and from 40° C. to 60° C. still in another embodiment.

After transferring or injection of the foam forming reaction mixture into the mold, it is desirable that the reaction mixture to have a slow initial reaction rate that allows the reaction mixture to fill the mold cavity and wet the fibers (optional component) before excessive viscosity increase or foaming. The cream time, also known as the initiation time, refers to the length of time that elapses from the beginning of mixing A-side and B-side until the start of foam rise. The present invention foam forming composition has a cream time of ≥20 s in one general embodiment, ≥30 s in another embodiment, and ≥35 s in still another embodiment, and ≥40 s in yet another embodiment. The present invention foam forming composition has a cream time of ≤150 s in one general embodiment, ≤130 s in another embodiment, ≤120 s in still another embodiment, and ≤100 s in yet another embodiment. Various methods known in the art can be used to measure cream time. In the present invention, the cream time is measured as described in the Examples herein below.

The process of making the foam includes the step of demolding the foam from the mold used to make the foam. Demolding time, also known as mold residence time, refers to the length of time that elapses from the beginning of mixing A-side and B-side until the molded part is removed from the mold. The minimum demolding time (MDT) refers to the shortest demolding time that is required to make a quality molded parts that can be accepted by industrial standards.

The foam article making process is improved because the MDT of the molded foam article can be reduced while maintaining a sufficient cream time using the foam-forming composition in the present invention while meeting other molded foam requirements. The MDT of a fabricated foam article can depend on various factors including, for example, the function of the mold configuration, the material that the mold is made of, temperature and reactivity of foam forming reaction mixture, molding conditions, PUR foam article dimensions. As one illustration of MDT observed during the fabrication of the molded foam articles of the present invention, and not to be limited thereby, the MDT can be <40 min in general. For example, MDT can range from 2 min to 40 min in one embodiment; from 4 min to 30 min in another embodiment, from 6 min to 25 min in still another embodiment; and from 7 min to 20 min in yet another embodiment.

The foam forming composition of the present invention also advantageously can lead to a reduction of MDT under the same processing conditions. For example, the MDT can be reduced by ≥10% in one embodiment, reduced by ≥25% in another embodiment, reduced by ≥40% in still another embodiment, and reduced by ≥50% in yet another embodiment.

The thickness of the resulting PUR foam article ranges from 5 mm to 155 mm in one embodiment, from 5 mm to 105 mm in another embodiment, and from 5 mm to 55 mm in still another embodiment.

The density of the resulting molded foam article (not including glass and/or carbon fiber) may range from 100 kg/m³ to 1000 kg/m³, 100 kg/m³ to 800 kg/m³, 200 kg/m³ to 1000 kg/m³; 250 kg/m³ to 800 kg/m³; 280 kg/m³ to 640 kg/m³; 300 kg/m³ to 560 kg/m³; and/or 320 kg/m³ to 480 kg/m³. Density may be determined according to ASTM D1622 and the values above are consistent with that method.

One embodiment of the process of making a molded PUR foam article includes providing glass and/or carbon fibers and/or other fibers wherein the fibers are provided in the form of chopped fibers, continuous tows, mats (both woven and non-woven), and the like are laid-up/distributed in the mold to which is introduced the foam forming composition resulting in the fabrication of a composite molded PUR article. The amount of fiber material ranges from 0.1 wt % to 30 wt % in one embodiment, from 3 wt % to 25 wt % in another embodiment, and from 5 wt % to 20 wt % in still another embodiment, based on the total weight of the PUR foam article.

In one embodiment, to achieve the necessary density described above of such PUR articles, the mold is generally overpacked, which means the amount of foam forming reaction mixture is more than the minimum amount needed to fill the mold cavity. The overpacking ratio (100 times the ratio of the amount of reaction mixture transferred to the mold divided by the minimum required weight to fill the mold cavity completely) can range from 100% to 600% in one embodiment, from 120% to 500% in another embodiment, and from 150% to 450% still in another embodiment.

The resulting foam product produced according to the above-described process utilizing the inventive foam forming composition advantageously exhibit some beneficial properties such as reduced defects while maintaining or improving the foam's mechanical properties and thermal stability. The defects of the molded foam article can include, for example, cracks, dimensional instability or distortion, post-molding shrinkage, and post-molding expansion. The mechanical properties of the molded foam article can include, for example, flexural modulus and flexural strength. The thermal stability can include, for example, the softening transition temperature as an indicator.

For example, the foam product produced using the foam forming composition of the can significantly improve the quality of foam articles by reducing the number and size of the crack defects. As one illustration of reduced crack defects from the molded foam articles of present invention, and not to be limited thereby, for example, the crack defects can be characterized by "crack defect ratio" for PUR foam articles produced using a square mold with inner dimensions of 17.8 cm×17.8 cm×5.1 cm (thickness). With reference to a molded foam article as described herein, a "crack defect ratio" refers to the sum of maxima in width of all cracks as seen on one cross section cutting surface of two half pieces of a foam article (such as seen in the foam article shown in FIG. 2 and FIG. 3) divided by the thickness dimension of the mold. The present invention foam forming compositions can lead to a crack defect ratio of from 0 to 0.06 in one general embodiment, from 0 to 0.04 in another embodiment, from 0 to 0.03 in still another embodiment; and zero (i.e., 0 or no cracks) or substantially zero in yet another embodiment.

Post-demold cracking generally results in bulging of the molded foam article (i.e., an expansion in the thickness of the molded foam article beyond the mold dimensions). As one illustration of reduced crack defects from the molded foam articles of present invention, and not to be limited thereby, for example, the bulging can be characterized by "bulging ratio" for PUR foam articles produced using a square mold with inner dimensions of 17.8 cm×17.8 cm×5.1 cm (thickness). With reference to a molded foam article as described herein, the "bulging ratio" of a molded foam article can be determined using the following equation:

$$\text{Bulging Ratio} = \left[ \frac{\text{maxima thickness of molded foam article} - \text{inner thickness of the mold}}{\text{inner thickness of the mold}} \right] \times 100$$

In general, the bulging ratio of the molded foam article of the present invention is <6% in one embodiment, <4% in another embodiment, <3% in still another embodiment, and 0% or substantially 0% in yet another embodiment, based on the inner height of the mold.

Cracking and bulging are normally not acceptable in molded foam article based on industrial standards. The present invention allows shorter DMT while achieving molded foam article without visual cracks or bulging, compared to foam articles made without using this invented foam forming composition. The present invention foam forming compositions also can lead to a reduction of MDT under the same processing conditions. For example, a reduction of MDT of the composition can be ≥10% reduction in one embodiment, ≥30% in another embodiment, ≥50% in still another embodiment, and ≥70% in yet another embodiment.

Despite the advantages of light weight and excellent mechanical properties of molded PUR foam articles, polyurethane materials of the prior art still have limitations in use temperature due to the inadequate thermal stability of the molded foam articles at elevated use temperatures including short term excursions to elevated temperatures. The molded foam articles may have a softening transition temperature at ≤135° C. with a use temperature of the molded PUR foam article being less than the softening transition temperature.

As is widely known in the field of PUR, the softening transition temperature can be measured via torsional bar rheology testing at a frequency of 1 Hz, 0.05% strain, 3° C./min ramping rate from −100° C. to 250° C. with the temperature corresponding to the tan(delta) maxima found in the temperature range between 50° C. and 250° C. being defined as the softening transition temperature. The present invention provides molded foam articles having a softening transition temperature above 140° C. in one embodiment, above 150° C. in another embodiment, and above 170° C. in still another embodiment. The present invention provides molded foam articles having a softening transition temperature ≤250° C. in one embodiment, ≤230° C. in another embodiment, and ≤200° C. in still another embodiment. In other embodiments the softening transition temperature of the molded foam article of the present invention can be from 140° C. to 250° C. in one embodiment, and from 140° C. to 190° C. in another embodiment. The improvement of softening transition temperature, compared to molded foam articles made without using the foam forming compositions of the present invention, is at least ≥10° C. in one embodiment, ≥15° C. in another embodiment, ≥30° C. in still another embodiment, and ≥50° C. in yet another embodiment.

The molded foam article produced using the foam forming composition of the present invention has good mechanical properties as measured, for example, by flexural modulus and flexural strength. The flexural modulus and flexural strength of a fabricated foam article can depend on various factors including, for example, the molding conditions as well as the fiber material content along with orientation factors. As one illustration of flexural properties observed during the fabrication of the molded foam articles of the present invention, and not to be limited thereby, for example, the flexural modulus of the molded foam of the present invention is >500 MPa in one embodiment; from 500 MPa to 800 MPa in another embodiment, and from 600 MPa to 1,200 MPa in still another embodiment. The flexural modulus of the foam can be measured by ASTM D790-17. For example, the flexural strength of the molded foam of the present invention is >12 MPa in one embodiment; from 12 MPa to 25 MPa in another embodiment, and from 15 MPa to 30 MPa in still another embodiment. The flexural strength of the foam can be measured by the procedure described in ASTM D790-17.

For an embodiment wherein the isocyanate index is, for example, <110, a foam-forming composition and process for producing a PUR foam article may provide sufficient cream time (e.g., a cream time of >20 s), reduced demolding time (e.g., DMT≤20 min and/or >20% DMT reduction), reduced defects (e.g., a crack defect ratio of <0.06 and/or a foam article quality ranking of ≥3), while maintaining or improving mechanical performance (e.g., a flexural modulus of >500 MPa, a flexural strength of >12 MPa) and improving thermal stability (e.g., a softening transition temperature of >140° C.).

For an embodiment wherein the isocyanate index is, for example, ≥110, a foam-forming composition and process for producing a PUR foam article may provide with sufficient cream time (e.g., a cream time of >20 s), reduced demolding time (e.g., MDT≤15 min and/or >20% MDT reduction), reduced defects (e.g., a crack defect ratio of <0.06 and/or a foam article quality ranking of ≥3), while improving mechanical performance (e.g., a flexural modulus of >600 MPa, a flexural strength of >12 MPa) and improving thermal stability (e.g., a softening transition temperature of >150° C.).

The foam forming composition and process of the present invention can be used to produce high density PUR foam articles for applications such an imitation structural construction material. The imitation structural construction material may provide substantially benefits, e.g., by providing lighter weight products without compromising performance. For example, the imitation structural construction material may be a replacement for traditionally used products in the construction industry such as wood, plywood, bricks, and stones. The imitation structural construction material may be a replacement of plywood and wood products for use in marine industry (e.g., decking and flooring), in transportation industry (e.g., shelving, cabinets, and side walls), and in building industry (e.g., shower pan, building walls, facades). For example, the imitation structural construction material may be referred to as imitation wood or brick, such that it can be used as a replacement for where wood/plywood are typically used and/or for where brick/stone are typically used. The term imitation is used as the imitation or brick may not include wood/stone and instead include (or consistent essentially of) polyurethane materials made in a mold from an isocyanate component and an isocyanate-reactive component and optionally a woven and/or non-woven fiber mat (for much the polyurethane materials are formed in situ in the mold around the a woven and/or non-woven fiber mat such that the mat is embedded with the polyurethane materials and in the imitation wood/brick).

EXAMPLES

The following examples are presented to further illustrate embodiments of the present invention in detail but are not to be construed as limiting the scope of the claims. Unless otherwise indicated, all parts and percentages are by weight.

Various ingredients, components, or raw materials used in the Inventive Examples (Inv. Ex.) and the Comparative Examples (Comp. Ex.) which follow are explained hereinbelow:

VORANOL™ 360 is a polyether polyol derived from sucrose, glycerine, and propylene oxide, having a hydroxyl number of 360 mg KOH/g and a nominal hydroxyl functionality of 5, from Dow Inc.

VORANOL™ 225 is a polyether polyol derived from glycerine and propylene oxide, having a hydroxyl number of 660 mg KOH/g and a nominal hydroxyl functionality of 3, from Dow Inc.

VORANOL™ CP1055 is a polyether polyol derived from glycerine and propylene oxide, having a hydroxyl number of 156 mg KOH/g and a nominal hydroxyl functionality of 3, from Dow Inc.

VORANOL™ 370 is a polyether polyol derived from sucrose, glycerine, and propylene oxide, having a hydroxyl number of 370 mg KOH/g and a nominal hydroxyl functionality of 7, from Dow Inc.

VORANOL™ 220-056N is a polyether polyol derived from propylene glycol and propylene oxide, having a hydroxyl number of 56 mg KOH/g and a nominal hydroxyl functionality of 2, from Dow Inc.

VORANOL™ 230-056 is a polyether polyol derived from glycerine and propylene oxide, having a hydroxyl number of 56 mg KOH/g and a nominal hydroxyl functionality of 3, from Dow Inc.

VORASURF™ DC193 (DC193) is a silicone surfactant available from Dow Inc.

POLYCAT™ SA2LE (SA2LE) is a low emissive, acid-blocked tertiary amine catalyst based on DBU (— 50% 1,8-diazabicyclo[5.4.0]undec-7-ene), available from Evonik Industries AG.

DABCO™ TMR30 (TMR30) is 2,4,6-tris(dimethylaminomethyl)phenol, an amine-based trimer catalyst available from Evonik Industries AG.

DABCO™ TMR20 (TMR20) is a metal-based trimer catalyst (14.5% potassium by weight), available from Evonik Industries AG.

DABCO™ T12 (T12) is a dibutyltin dilaurate gel catalyst, available from Evonik Industries AG.

POLYCAT™ 46 is a metal-based trimer catalyst comprising potassium acetate (18% potassium by weight), available from Evonik Industries AG.

DABCO™ 33 LV (33LV) is a gel catalyst (a 33% solution of triethylenediamine in propylene glycol), available from Evonik Industries AG.

2-Ethylhexanoic acid (EHA) is available from MilliporeSigma.

Water is deionized water having a specific resistance of 10 MΩ×cm (million ohms) at 25° C.

PAPI™ 27 is a polymethylene polyphenylisocyanate containing methylene diphenyl diisocyanate (MDI) with 31.5% isocyanate from Dow Inc.

Heavy weight fiberglass (HWF) mat (woven, 24 oz/yd$^2$=814 g/m$^2$) is available from Vernese Customs.

Chopped strand fiberglass mat (CFM) (nonwoven, 1 oz/yd$^2$=34 g/m$^2$) is available from Griffco Products LLC.

Hydroxyl number (OH #) is measured and determined according to ASTM D4274-16, Method D.

TABLE I

Foam Forming Reaction Mixture Compositions for PUR Foams

| Component | Comp. Ex. A (pbw) | Comp. Ex. B (pbw) | Comp. Ex. C (pbw) | Inv. Ex. 1 (pbw) | Inv. Ex. 2 (pbw) | Inv. Ex. 3 (pbw) |
|---|---|---|---|---|---|---|
| Isocyanate-Reactive Composition (B-side) | | | | | | |
| VORANOL ™ 360 | 41.28 | 45.28 | 41.28 | 41.28 | 41.28 | 41.28 |
| VORANOL ™ 225 | 17.44 | 17.44 | 17.44 | 17.44 | 17.44 | 17.44 |
| VORANOL ™ 370 | 12 | 10 | | 12 | 12 | 12 |
| VORANOL ™ CP1055 | 29.28 | 27.28 | 41.28 | | | |
| VORANOL ™ 220-056N | | | | 29.28 | | |
| VORANOL ™ 230-056 | | | | | 29.28 | 29.28 |
| T12 | | | 0.02 | | | |
| SA2LE | 0.60 | 0.50 | | 0.60 | 0.60 | 0.31 |
| POLYCAT ™ 46 | | 0.30 | 1.00 | | | |
| 33LV | 0.41 | 0.30 | 0.25 | 0.41 | 0.41 | 0.13 |
| TMR30 | 0.70 | | | 0.70 | 0.70 | |
| TMR20 | | | | | | 1.13 |
| DC193 | 2.50 | 2.00 | 3.00 | 2.50 | 2.50 | 2.50 |
| EHA | 0.10 | 0.10 | 0.10 | 0.10 | 0.10 | 0.10 |
| Water | 1.08 | 1.26 | 1.40 | 1.07 | 1.07 | 1.26 |
| Isocyanate Component (A-side) | | | | | | |
| PAPI ™ 27 | 107.39 | 149.23 | 151.10 | 98.25 | 98.25 | 147.85 |
| Formulation Characteristics | | | | | | |
| Index | 106 | 142 | 150 | 106 | 106 | 150 |
| Water content, wt % | 0.50 | 0.50 | 0.50 | 0.50 | 0.50 | 0.50 |

General Procedure for Determining the Reaction Reactivity of PUR Foams

The reaction kinetics parameters including the cream time, gel time, and tack-free time are determined for the reaction mixture provided herein in Table I using a PUR cup foam with a wood tongue depressor. A total of 100 g of foam forming reaction mixture is used in a 1,000 mL beaker to make a cup foam. The amounts of each component are given in pbw based on the total weight of the foam forming reaction mixture used to form the PUR foam. Admix the isocyanate-reactive composition (B-side) by thoroughly mixing the components of the isocyanate-reactive composition provided in Table I at 3,000 rpm with a rotary mixer for 30 s. Next, mix the isocyanate-reactive composition and polyisocyanate component (A-side) in the beaker again at 3,000 rpm for 10 s at room conditions (23° C. and 50% relative humidity).

The cream time is defined as the time from the preparation of the reaction mixture until the recognizable beginning of the foaming mixture such as a visual change of the reactants (color change and/or start of rise) occurs.

The gel time (or string time) is defined as the time from the preparation of the reaction mixture until the transition from the fluid to the solid state is reached. The gel time is determined by repeatedly: dipping a wood tongue depressor into the reaction mixture and pulling the wood tongue depressor out of the reaction mixture. The gel time is reached as soon as strings are formed while pulling the wood tongue depressor out of the reaction mixture.

The tack-free time is defined as the time from the preparation of the foam reaction mixture until the surface of the foam is tack free. Tack-free time is determined by depositing a wood tongue depressor on the foam surface. The foam tack-free time is reached when lifting the wood tongue depressor does not lead to delamination or rupture of the foam surface. In other words, the foam tack-free time is reached when the foam surface is no longer tacky. The free rise density of the cup foam is measured to be about from 100 kg/m$^3$ to 105 kg/m$^3$.

General Procedure for Determining the Free Rise Density of PUR Foams

The FRD is determined for the reaction mixture provided herein in Table I using a PUR cup foam. A total of 140 g of foam forming reaction mixture is used in a 1,000 mL beaker to make a cup foam. The amounts of each component are given in pbw based on the total weight of the foam forming reaction mixture used to form the PUR foam. Admix the isocyanate-reactive composition (B-side) by thoroughly mixing the components of the isocyanate-reactive composition provided in Table I at 3,000 rpm with a rotary mixer for 30 s. Next, mix the isocyanate-reactive composition and polyisocyanate component (A-side) in the beaker again at 3,000 rpm for 10 s at room conditions (23° C. and 50% relative humidity). After 24 hr, remove the foam section that has risen above the plane of the beaker top and measure the weight of the PUR foam remained in the beaker. The FRD is calculated as the weight of the PUR foam remained in the beaker divided by the total volume of the beaker (1,090 mL) and reported in the unit of kg/m$^3$.

The reaction reactivity and FRD of each of the foam forming composition Comp Ex. (A, B, C) and Inv. Ex. (1, 2, 3) was determined using the general procedure for determining the reaction reactivity described above. The results for each of the foam reactive compositions of the Inv. Ex. and Comp. Ex. are described in Table II.

With respect to Table II, it is noted that all the formulations provide a dense polyurethane foam, which it is understood may be desirable for use of the foam as an imitation structural construction material. However, as shown further below, not all of the dense foams are usable as an imitation structural construction material.

TABLE II

Foam Forming Composition Reaction Reactivity and Foam Characteristics

| | Example No. Cup Foam | | | | | |
|---|---|---|---|---|---|---|
| | Comp. Ex. A | Comp. Ex. B | Comp. Ex. C | Inv. Ex. 1 | Inv. Ex. 2 | Inv. Ex. 3 |
| | | | Mold Foam Article | | | |
| | Comp. Ex. D, E | Comp. Ex. F | Comp. Ex. G, H | Inv. Ex. 4 | Inv. Ex 5-6 | Inv. Ex. 7-10 |
| Cream time, s | 60 | 80 | 47 | 50 | 52 | 55 |
| Gel time, s | 140 | 210 | 100 | 145 | 160 | 130 |
| Tack-free time, s | 175 | 325 | 130 | 205 | 230 | 185 |
| Free rise density, kg/m$^3$ | 105 | 102 | 102 | 105 | 105 | 100 |
| Molded PUR foam article density (without fiber), kg/m$^3$ | 360 | 360 | 360 | 360 | 360 | 360 |
| Overpacking, % | 342 | 353 | 353 | 342 | 342 | 360 |
| Molded PUR foam article density (with fiber), kg/m$^3$ | 393 | 393 | 393 | 393 | 393 | 393 |

Examples 4-10 and Comparative Examples D-H: Polyurethane Foam Articles

Part A: General Procedure for Preparing Molded Foam Articles

Prepare the PUR molded foam articles using the components in the reaction mixtures described in Table I. The amounts of each component are given in pbw based on the total weight of the reaction mixture used to form the PUR foam.

The preparation of molded foam article includes the steps of: (1) admix B-side isocyanate-reactive composition by thoroughly mixing the components of the isocyanate-reactive composition provided in Table I at 3,000 rpm with a rotary mixer for 30 s; (2) equilibrate the A-side polyisocyanate component and B-side isocyanate-reactive composition to room temperature (23° C.); (3) ensure all mold surfaces are clean and covered with sufficient mold release; (4) lay down four layers of fiberglass mats (in the order of CFM/HWF/HWF/CFM) in the mold (inner dimension of 17.8 cm length×17.8 cm width×5.1 cm height); (5) preheat the mold with fiberglass mats in the Wabash hydraulic press to the determined molding temperature; (6) mix a total of 625 g of foam forming reaction mixture in a 1,000 mL beaker at 3,000 rpm for 10 s at room conditions (23° C. and 50% relative humidity); Start timer at the beginning of mixing; (7) transfer the foam forming reaction mixture to the mold immediately and put the mold onto a Wabash hydraulic press and close the press to a force of 100 kN to allow the resulting foam-forming composition to react to form a PUR foam article in the mold (.i.e., a molded foam); (8) open the press after reaching the preset demolding time and completely demolding the foam article; and (9) observe the foam article for defects such as swelling, shrinkage, bulging, and cracking, if any. Generally, the density of the board is about 393 kg/m$^3$.

All Comp. Ex. (D, E, F, G, H) and Inv. Ex. (4, 5, 6, 7, 8, 9, 10) molded PUR foam articles were fabricated using the General Procedure described above.

Part B: Evaluation of Molded Polyurethane Boards (1) Split/Crack Determination

Condition the demolded PU board at room conditions (23° C., 50% relative humidity) for at least 24 hr. Next, cut the board in half and qualitatively rank the board quality based on the visual observation of the cross section as shown in FIGS. 1-3.

Figure 2:
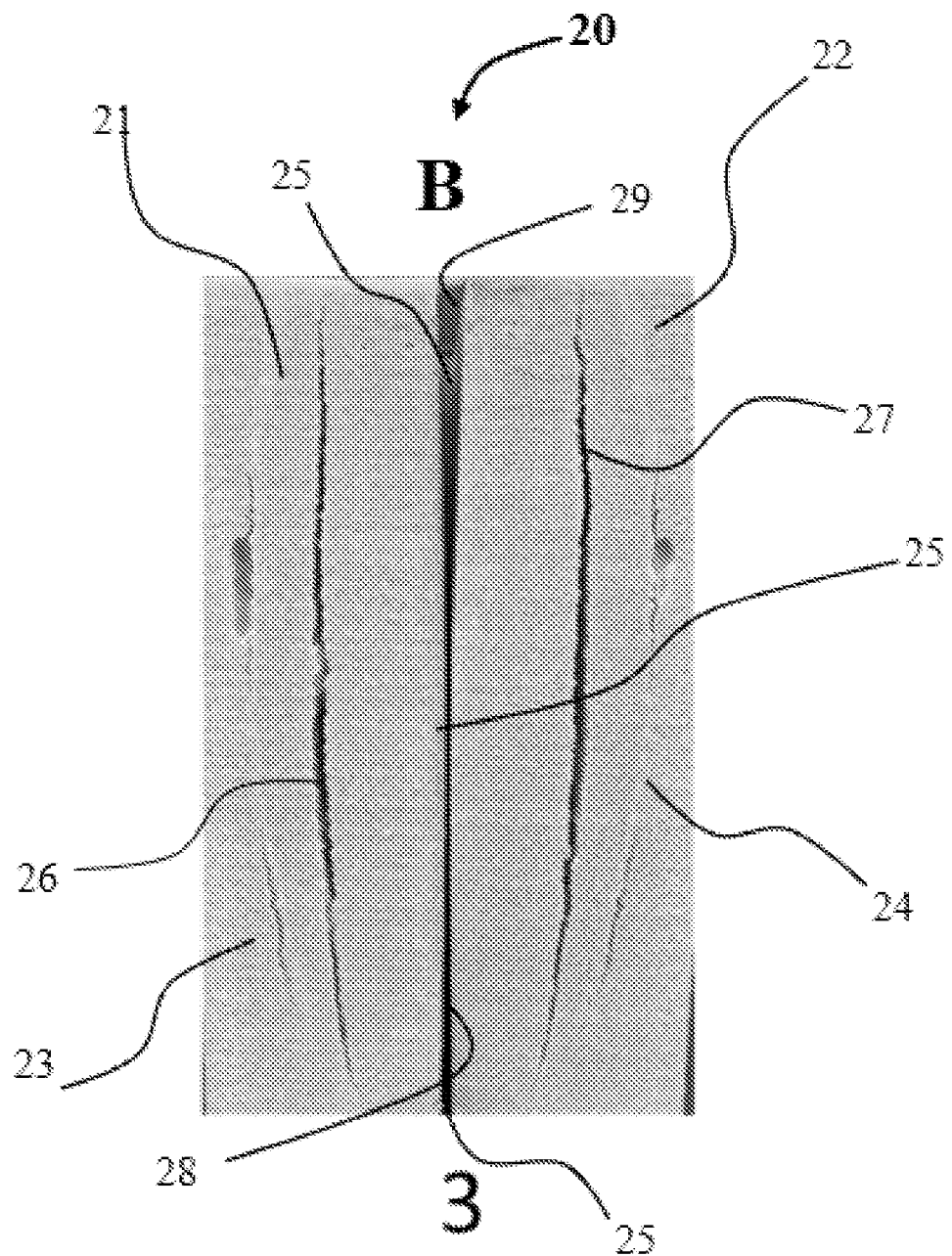
FIG. 2 is a perspective front view of another alternative embodiment of a PUR foam article showing the foam article cut in half and showing the two separate cut pieces placed side by side with the surface of the cut edges of the foam article pieces being shown.
Figure 3:
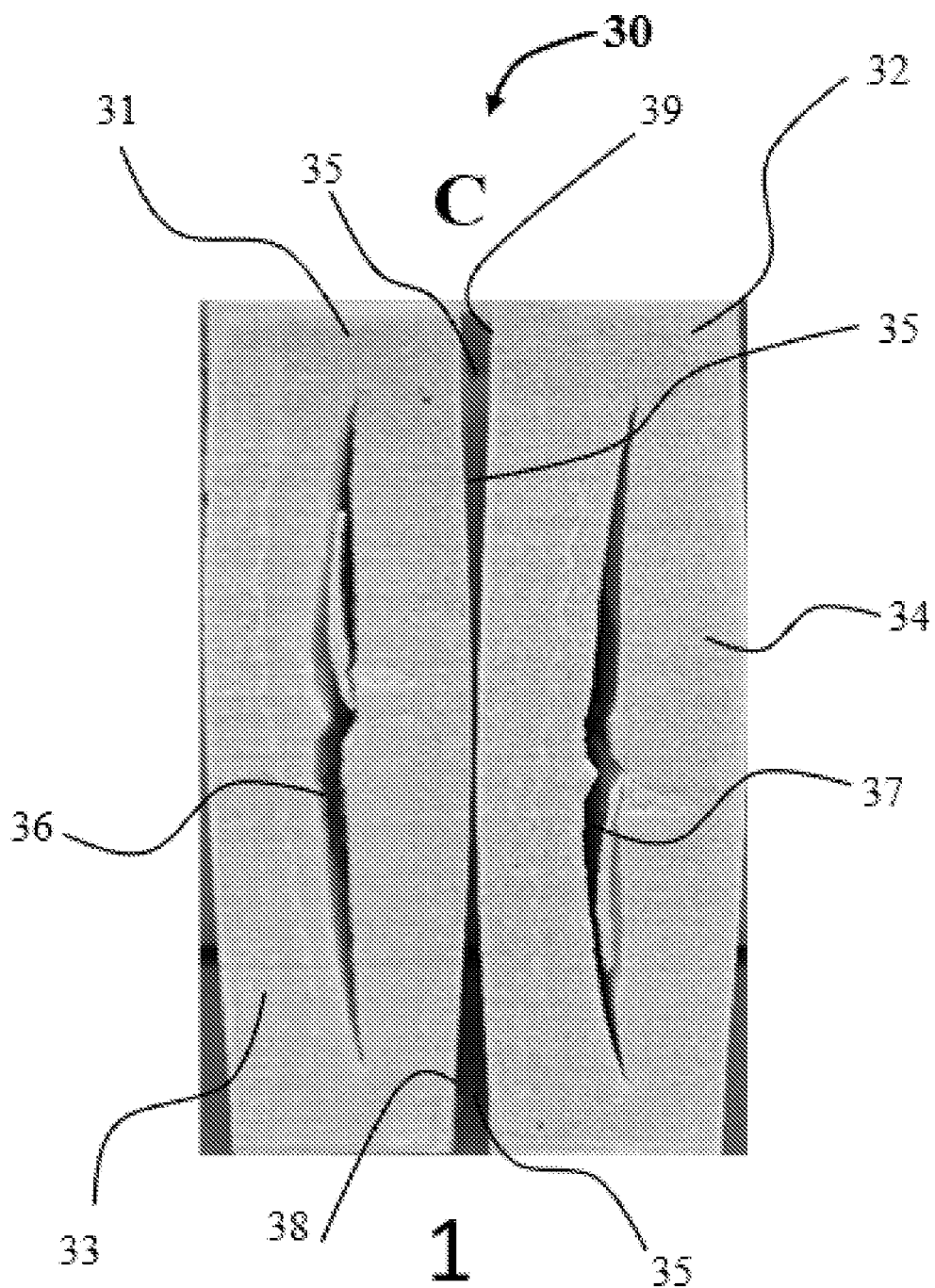
FIG. 3 is a perspective front view of a PUR foam article showing the foam article cut in half and showing the two separate cut pieces placed side by side with the surface of the cut edges of the foam article pieces being shown.

With reference to FIGS. 1-3, there is shown three different PU foam articles, A-C (or FIGS. 1-3), with different board qualities. The board quality ranking is determined by visual observation and assigned a ranking score number of "1", "3" or "5" with "1" being the worst quality and "5" being the best quality. A ranking score of "5", as shown by Board A in FIG. 1, is prescribed to a board when no bulging and/or cracks are visually present in the board. A ranking score of "3", as shown by Board B in FIG. 2, is prescribed to a board when thin cracks are visually present in the board. A ranking score of "1", as shown by Board A in FIG. 3, is prescribed to a board when bulging and/or wide cracks are visually present in the board.

With reference to FIG. 1 again, there is shown a PUR foam article "A", generally referenced with numeral 10 cut in half forming two halves 11 and 12 showing the cut surfaces 13 and 14, respectively. The two halves 11 and 12 are abutted against each other showing a fine contiguous, substantially straight border line 15 indicating that the surfaces and dimensions of the two halves are straight when placed against each other. In addition, no cracks or bulging are visually present in the two halves; and since the two halves in FIG. 1 show no signs of cracks or bulging, the foam article quality is ranked as excellent, i.e., the foam article has a ranking of "5".

With reference to FIG. 2 again, there is shown a PUR foam article "B", generally referenced with numeral 20 cut in half forming two halves 21 and 22 showing the cut surfaces 23 and 24, respectively. The two halves 21 and 22 are abutted against each other showing a slightly bulging border line 25 indicating that the surfaces and dimensions of the two halves are not exactly straight when placed adjacent and against each other. In addition, thin cracks 26 and 27 are formed in halves 21 and 22, respectively. And, a slight bulging of the two halves is visually present as the two halves only physically contact each other at some areas in the border line 25 and are separated spaced apart in other areas in the border line 25 such as the edge 28 of the half 21 and edge 29 of half 22. Since the two halves in FIG. 2 show some signs of cracks and bulging, the foam article quality has a ranking of "3". And, a slight bulging of the two halves is visually present as the two halves only physically contact each other at some places in the border line 25 and are separated spaced in other places.

With reference to FIG. 3 again, there is shown a PUR foam article "C", generally referenced with numeral 30 cut in half forming two halves 31 and 32 showing the cut surfaces 33 and 34, respectively. The two halves 31 and 32 are abutted against each other showing a significant bulging border line 35 indicating that the surfaces and dimensions of the two halves are definitively not straight when placed adjacent and against each other. In addition, wide cracks 36 and 37 are formed in halves 31 and 32, respectively. And, a consequential bulging of the two halves is visually present as the two halves slightly physically contact each other at some areas in the border line 35 and separate apart in other areas in the border line 35 such as the edge 38 of the half 31 and edge 39 of half 32. Since the two halves in FIG. 3 show substantial signs of cracks and bulging, the foam article has a ranking of "1".

(2) Flexural Modulus and Flexural Strength

Condition the demolded PU board at room conditions (23° C., 50% relative humidity) for at least 24 hr. For each PU board, the top slice of ~8 mm thickness is cut out from the board. Specimens (7 inches length×1 inch width=17.8 cm length×2.5 cm width) are prepared from this top slice and used to test the flexural modulus and flexural strength according to ASTM D790-17.

(3) Determination of Softening Transition Temperature

Excise a bar specimen (approximately 50 mm length×8 mm width×3 mm thickness) from the center layer of a molded PU board. Determine the softening transition temperature of the bar specimen using a torsional rheology test on a TA Instruments ARES-G2 Rheometer instrument. Equilibrate the specimen at −100° C., then run a temperature ramp experiment at an oscillation strain of 0.05%, an angular frequency of 1 Hz, and a temperature ramping rate of 3° C./min under nitrogen from −100° C. to 250° C. Define the softening transition temperature as the temperature corresponding to the tan(delta) maxima in the temperature range of between 50° C. to 250° C.

According to the results described in Table III, for a PUR foam article with an isocyanate index of <110, surprising improvements can be observed in a foam article produced from the foam forming composition of the present invention (formulations of Inv. Ex. 1 and Inv. Ex. 2) compared to a foam articled produced using the formulation of Comp. Ex. A. For example, using the foam forming composition of the present invention: (1) a significant improvement in board quality can be achieved when foam articles are molded under the same conditions; and (2) a reduction of MDT at 54° C. of 20 min or less can be achieved while maintaining the quality of a foam article.

TABLE III

Molding Conditions and Properties (Isocyanate Index <110)

| | | Molding Conditions | | Results | | | Softening |
|---|---|---|---|---|---|---|---|
| Example No. | Formulation Example No. Used | Temperature (° C.) | Demolding Time (min) | Foam Article Quality Ranking | Flexural Modulus (MPa) | Flexural Strength (MPa) | Transition Temperature (° C.) |
| Comp. Ex. D | Comp. Ex. A | 54 | 20 | 1 | 587 | 17.8 | 133 |
| Inv. Ex. 4 | Inv. Ex. 1 | 54 | 20 | 5 | 562 | 15.3 | 152 |
| Inv. Ex. 5 | Inv. Ex. 2 | 54 | 20 | 5 | 843 | 22.4 | 152 |
| Inv. Ex. 6 | Inv. Ex. 2 | 54 | 15 | 3 | — | — | — |

According to the results described in Table IV, for a PUR foam article with an isocyanate index of ≥110, surprising improvements can be observed in a foam article produced from the foam forming composition of the present invention (formulation of Inv. Ex. 3) compared to a foam articled produced using the formulations of Comp. Ex. A and Comp. Ex. B. For example, using the foam forming composition of the present invention: (1) a significant reduction of MDT at 54° C. (as compared up to 60° C.) can be achieved, for instance, from >30 min (Comp. Ex. F) to 12 min (Inv. Ex. 8); (2) a significant increase of a foam article's mechanical performance (e.g., flexural modulus and flexural strength) can be achieved even when a foam forming composition is cured at lower temperature and/or demolded at short demolding time; (3) a significant increase of a foam article's thermal stability (e.g., a much higher softening transition temperature) can be achieved; and (4) a lower molding temperature can be used and still an improved mechanical performance and a good quality foam article can be achieved.

Further, it is seen that a consistent high foam article quality can be achieved (see Ranking of 5 for all of Inv. Examples 7 to 10). It is understood that for use of a polyurethane foam as an imitation structural construction material (such as imitation brick and/or imitation wood) there should be little to no bulging and cracking visually observable (i.e., a ranking of 5 is highly desirable).

TABLE IV

Molding Conditions and Properties (Isocyanate Index ≥110)

| | | Molding Conditions | | Results | | | |
|---|---|---|---|---|---|---|---|
| Example No. | Formulation Example No. Used | Temperature (° C.) | Demolding Time (min) | Foam Article Quality Ranking | Flexural Modulus (MPa) | Flexural Strength (MPa) | Softening Temperature (° C.) |
| Comp. Ex. E | Comp. Ex. A | 54 | 20 | 1 | 587 | 17.8 | 133 |
| Comp. Ex. F | Comp. Ex. B | 57 | 30 | 3 | | | |
| Comp. Ex. G | Comp. Ex. C | 45 | 15 | 1 | | | |
| Comp. Ex. H | Comp. Ex. C | 60 | 15 | 1 | | | |
| Inv. Ex. 7 | Inv. Ex. 3 | 54 | 15 | 5 | 1091 | 21.3 | 190 |
| Inv. Ex. 8 | Inv. Ex. 3 | 54 | 12 | 5 | 1059 | 25.9 | 188 |
| Inv. Ex. 9 | Inv. Ex. 3 | 54 | 9 | 3 | 641 | 12.8 | |
| Inv. Ex. 10 | Inv. Ex. 3 | 29 | 18 | 5 | 778 | 18.1 | |

What is claimed is:

1. A foam-forming composition for producing a polyurethane rigid molded foam article for making structural construction materials, the foam-forming composition comprising:
   (a) at least one isocyanate component; and
   (b) at least one isocyanate-reactive component comprising an isocyanate-reactive composition including:
      (bi) a rigid polyol blend having a nominal hydroxyl functionality from 3 to 10 and a hydroxyl number from 125 mg KOH/g to 800 mg KOH/g, the the rigid polyol blend comprising at least the following:
         (bi1) a first rigid polyether polyol having a nominal hydroxyl functionality of 5 and a hydroxyl number from 300 mg KOH/g to 450 mg KOH/g,
         (bi2) a second rigid polyether polyol having a nominal hydroxyl functionality of 7 and a hydroxyl number from 300 mg KOH/g to 450 mg KOH/g, and
         (bi3) a third rigid polyether polyol having a nominal hydroxyl functionality of 3 and a hydroxyl number from 600 mg KOH/g to 800 mg KOH/g; and
      (bii) at least one flexible polyol compound having a nominal hydroxyl functionality from 2 to 3 and having a hydroxyl number from 20 mg KOH/g to 100 mg KOH/g;
   (c) a catalyst package comprising at least one latent gelling catalyst; and
   (d) at least one blowing agent;
   wherein an isocyanate index of the foam-forming composition is from 90 to 400 and the polyurethane rigid molded foam article has a molded foam density of from 100 kg/m$^3$ to 1000 kg/m$^3$ according to ASTM D1622.

2. The composition of claim 1, wherein the at least one flexible polyol compound is present in an amount from 10 wt % to 40 wt %, based on a total weight of the at least one isocyanate-reactive component, and the polyurethane rigid molded foam article has a molded foam density of from 200 kg/m$^3$ to 1000 kg/m$^3$ according to ASTM D1622.

3. The composition of claim 1, wherein:
   (bi1) the first rigid polyether polyol is present in an amount from 30 wt % to 50 wt %, based on a total weight of the at least one isocyanate-reactive component;
   (bi2) the second rigid polyether polyol is present in an amount from 5 wt % to 25 wt %, based on the total weight of the at least one isocyanate-reactive component; and
   (bi3) the third rigid polyether polyol is present in an amount from 10 wt % to 35 wt %, based on the total weight of the at least one isocyanate-reactive component,
   the at least one flexible polyol compound is present in an amount from 20 wt % to 40 wt %, based on the total weight of the at least one isocyanate-reactive component, and
   the polyurethane rigid molded foam article has a molded foam density of from 200 kg/m$^3$ to 800 kg/m$^3$ according to ASTM D1622.

4. The composition of claim 1, wherein the catalyst package further includes a trimerization catalyst; wherein a weight ratio of trimerization catalyst to the at least one latent gelling catalyst is from 0.2 to 10.0.

5. The composition of claim 1, wherein the polyurethane rigid molded foam article further includes a woven and/or non-woven fiber mat and the foam-forming composition is provided on the woven and/or non-woven fiber mat.

6. The composition of claim 1, wherein the polyurethane rigid molded foam article is an imitation structural construction material.

7. The composition of claim 1, wherein the polyurethane rigid molded foam article is an imitation wood or brick.

8. A process of making polyurethane rigid molded foam including providing the foam-forming composition as claimed in claim 1, the polyurethane rigid molded foam being an imitation structural construction material.

9. The process of claim 8, wherein a crack defect ratio of the polyurethane rigid molded foam is less than 0.06 and a bulging ratio of the polyurethane rigid molded foam is less than 6 percent.

* * * * *